US011694270B2

(12) United States Patent
Tanaka

(10) Patent No.: US 11,694,270 B2
(45) Date of Patent: *Jul. 4, 2023

(54) OBJECTIVE ACHIEVEMENT PORTFOLIO GENERATING DEVICE, PROGRAM, AND METHOD

(71) Applicant: Nomura Research Institute, Ltd., Tokyo (JP)

(72) Inventor: Tatsuo Tanaka, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,160

(22) Filed: May 5, 2022

(65) Prior Publication Data

US 2022/0261915 A1 Aug. 18, 2022

Related U.S. Application Data

(63) Continuation of application No. 16/069,833, filed as application No. PCT/JP2017/005247 on Feb. 14, 2017, now Pat. No. 11,354,745.

(30) Foreign Application Priority Data

Mar. 23, 2016 (JP) ............................. JP2016-058912

(51) Int. Cl.
G06Q 40/06 (2012.01)
G06Q 40/02 (2023.01)
(Continued)

(52) U.S. Cl.
CPC ........... *G06Q 40/06* (2013.01); *G06F 3/0482* (2013.01); *G06F 3/04847* (2013.01);
(Continued)

(58) Field of Classification Search
None
See application file for complete search history.

(56) References Cited

U.S. PATENT DOCUMENTS 6,684,190 B1 * 1/2004 Powers ................. G06Q 40/06
705/36 R
7,877,308 B1 * 1/2011 Padgette ............... G06Q 10/04
705/37

(Continued)

FOREIGN PATENT DOCUMENTS

AU 2017101891 A4 * 12/2020
CN 1567319 A 1/2005
(Continued)

OTHER PUBLICATIONS

Keijiro Wada et al., "Beikoku de Kakudai suru 'Robo Advisor' ni yoru Kojin Toshika Muke Shisan Un' yo" 1 Nomura Capital Markets Quarterly, Feb. 1, 2015, 2015 Winter issue, vol. 18 No. 3, pp. 111 to 121; Cited in ISR.

(Continued)

Primary Examiner — Paul S Schwarzenberg
(74) Attorney, Agent, or Firm — Rankin, Hill & Clark LLP

(57) ABSTRACT

An object of the present invention is to generate a single portfolio assuming a plurality of targets as a specific objective of investment management, and also to make it possible to easily generate a plurality of portfolios having the same objective followed by comparing and contrasting of the plurality of portfolios. To this end, an investment management assistance server 10 that generates, based on input information, portfolio information for suggesting investment management for objective achievement set by a customer includes: objective display means 13 that displays predetermined objective information selectable by a customer through an input operation; interview display means (Continued)

14 for displaying predetermined interview information to which the customer is allowed to respond through an input operation; and portfolio generation/display means 15 for generating predetermined portfolio information based on the objective information and interview information which are selected and responded to through an input operation, and causing the customer terminal 30 to display the predetermined portfolio information in a visually recognized manner. The portfolio generation/display means 15 is configured to generate portfolio information for suggesting a single investment management corresponding to one or more pieces of objective information selected by the customer.

20 Claims, 18 Drawing Sheets

(51) Int. Cl.
G06F 16/904 (2019.01)
G06F 3/0482 (2013.01)
G06F 3/04847 (2022.01)
G06N 5/043 (2023.01)

(52) U.S. Cl.
CPC ........... *G06F 16/904* (2019.01); *G06N 5/043* (2013.01); *G06Q 40/02* (2013.01)

(56) References Cited

U.S. PATENT DOCUMENTS

| | | | | |
|---|---|---|---|---|
| 8,024,213 | B1* | 9/2011 | Fano | G06Q 30/0201 |
| | | | | 705/7.29 |
| 9,519,932 | B2* | 12/2016 | Caiman | G06Q 40/02 |
| 2003/0004845 | A1 | 1/2003 | Takeda et al. | |
| 2003/0088489 | A1* | 5/2003 | Peters | G06Q 40/06 |
| | | | | 705/36 R |
| 2004/0030628 | A1 | 2/2004 | Takamoto et al. | |
| 2004/0054610 | A1* | 3/2004 | Amstutz | G06Q 40/02 |
| | | | | 705/36 R |
| 2007/0244780 | A1 | 10/2007 | Liu | |
| 2010/0306126 | A1* | 12/2010 | Moran | G06Q 40/06 |
| | | | | 705/36 R |
| 2013/0262237 | A1* | 10/2013 | Gaskell, II | G06Q 50/01 |
| | | | | 705/14.66 |
| 2015/0364057 | A1* | 12/2015 | Catani | G16H 10/60 |
| | | | | 434/262 |
| 2020/0401978 | A1* | 12/2020 | Popelka | G06F 16/248 |
| 2022/0028004 | A1* | 1/2022 | Berd | G06Q 50/186 |

FOREIGN PATENT DOCUMENTS

| | | | |
|---|---|---|---|
| CN | 101460968 | A | 6/2009 |
| CN | 101877108 | A | 11/2010 |
| JP | 2000-293569 | A | 10/2000 |
| JP | 2004-62871 | A | 2/2004 |
| JP | 2008-243158 | A | 10/2008 |
| JP | 2014-525062 | A | 9/2014 |
| WO | 2012/162722 | A1 | 12/2012 |
| WO | 2015/077689 | A1 | 5/2015 |
| WO | WO-2015077689 | A1 * | 5/2015 ........... G06Q 10/101 |

OTHER PUBLICATIONS

Takashi Yoshinaga, "Beikoku no Robo Advisor ni yoru Hito tono Kyoso to Kyosei", Knowledge Creation and Integration, Mar. 20, 2015, vol. 23, No. 4, pp. 114 to 115; Cited in ISR.

Kata OKADA et al., "Beikoku no Shisan Un'yo Gyokai de Chumoku sareru Robo Advisor", Nomura Capital Markets Quarterly, Nov. 1, 2015, 2015 Autumn issue, vol. 19, No. 2, pp. 53 to 66; Cited in ISR.

Ryusuke Hoshi et al., "Beikoku Rep as Advisor Program No. Shikumi to Tokucho", Nomura Capital Markets Quarterly, Aug. 1, 2014, 2014 Summer issue, vol. 18, No. 1, pp. 116 to 132; Cited in ISR.

Shosaku Tobioka, "Oshu ni Okeru Online o Katsuyo shita Aratana AP Toshi Advise no Keitai", Nomura Capital Markets Quarterly, Feb. 1, 2016, 2016 winter issue, vol. 19, No. 3, pp. 25 to 46; Cited in ISR.

Robo Advisor Daremo ga Tegaru ni Bunsan Toshi o Jitsugen, Nikkei Money, Mar. 21, 2016, No. 407, pp. 100to 101; Cited in ISR.

Shitto suru Ginko, Nikkei Computer, Aug. 6, 2015, No. 892, pp. 24 to 26; Cited in ISR.

International Search Report (ISR) dated May 16, 2017 in corresponding International Patent Application No. PCT/JP2017/005247.

Chinese Office Action (CNOA) dated Nov. 18, 2021 for corresponding Chinese Patent Application No. 201780015080.X.

* cited by examiner

FIG. 5

TARGET AMOUNT AND OBJECTIVE ACHIEVEMENT SCHEDULE

SET YOUR TARGET AMOUNT AND OBJECTIVE ACHIEVEMENT SCHEDULE

NOTE
NAME OF SELECTED SAMPLE IS PRESET. IF YOU WOULD LIKE TO CHANGE IT WITH ANOTHER NAME, PLEASE INPUT IT.

CONDOMINIUM TOKYO METROPOLITAN AREA 50,000,000 YEN

TARGET AMOUNT
ROUGH AMOUNT OF SELECTED SAMPLE PROPERTY IS PRESET.
IF YOU WOULD LIKE TO SET AMOUNT OF DOWN PAYMENT AS
TARGET AMOUNT, PLEASE INPUT AMOUNT OF DOWN PAYMENT.

OBJECTIVE ACHIEVEMENT SCHEDULE
PLEASE INPUT DUE DATE FOR OBJECTIVE ACHIEVEMENT.

10,000,000 YEN    8 YEARS    0 MONTHS LATER

ADD OBJECTIVE    ENTER

FIG. 6

OBJECTIVE NAVIGATOR    HELP  INQUIRY  LOGIN

ADDED OBJECTIVE LIST    INTRODUCTION  SET OBJECTIVE  INVESTMENT PLAN  COMPLETE

IF YOU WOULD LIKE TO ADD MORE OBJECTIVES, PLEASE CLICK "ADD OBJECTIVE"

TARGET AMOUNT: 10,000,000 YEN / TARGET ACHIEVEMENT SCHEDULE: 8 YEARS 0 MONTHS LATER

CONDOMINIUM TOKYO METROPOLITAN AREA 50,000,000 YEN
TARGET AMOUNT: 10,000,000 YEN  OBJECTIVE ACHIEVEMENT SCHEDULE: 8 YEARS 0 MONTHS LATER    DELETE

ADD OBJECTIVE    PROCEED WITH INVESTMENT PLAN FOR THIS OBJECTIVE

FIG. 9

TARGET AMOUNT AND OBJECTIVE ACHIEVEMENT SCHEDULE

SET YOUR TARGET AMOUNT AND OBJECTIVE ACHIEVEMENT SCHEDULE

NOTE
NAME OF SELECTED SAMPLE IS PRESET. IF YOU WOULD LIKE TO CHANGE IT WITH ANOTHER NAME, PLEASE INPUT IT.

| MERCEDES-BENZ C-CLASS C450 AMG 4MATIC X,780,000 YEN |

TARGET AMOUNT
ROUGH AMOUNT OF SELECTED SAMPLE AUTOMOBILE TYPE IS PRESET.
IF YOU WOULD LIKE TO SET AMOUNT OF DOWN PAYMENT AS TARGET
AMOUNT, PLEASE INPUT AMOUNT OF DOWN PAYMENT.

OBJECTIVE ACHIEVEMENT SCHEDULE
PLEASE INPUT DUE DATE FOR OBJECTIVE ACHIEVEMENT.

2,000,000 YEN    4 YEARS    0 MONTHS LATER

ADD OBJECTIVE    ENTER

FIG. 10

OBJECTIVE NAVIGATOR     HELP  INQUIRY  LOGIN

ADDED OBJECTIVE LIST    INTRODUCTION  SET OBJECTIVE  INVESTMENT PLAN  COMPLETE

IF YOU WOULD LIKE TO ADD MORE OBJECTIVES, PLEASE CLICK "ADD OBJECTIVE"

TARGET AMOUNT: 12,000,000 YEN / TARGET ACHIEVEMENT SCHEDULE: 8 YEARS 0 MONTHS LATER

CONDOMINIUM TOKYO METROPOLITAN AREA 50,000,000 YEN
TARGET AMOUNT: 10,000,000 YEN    OBJECTIVE ACHIEVEMENT SCHEDULE: 8 YEARS 0 MONTHS LATER    [DELETE]

MERCEDES-BENZ C-CLASS C450 AMG 4MATIC X,780,000 YEN
TARGET AMOUNT: 2,000,000 YEN    OBJECTIVE ACHIEVEMENT SCHEDULE: 4 YEARS 0 MONTHS LATER    [DELETE]

ADD OBJECTIVE    PROCEED WITH INVESTMENT PLAN FOR THIS OBJECTIVE

FIG. 17

(a) RISK DETERMINATION DEFINITION TABLE

| | | | | | | | |
|---|---|---|---|---|---|---|---|
| ① AGE | TEENS OR YOUNGER | TWENTIES | THIRTIES | FORTIES | FIFTIES | SIXTIES | 70 |
| DETERMINATION POINT | 5 | 5 | 10 | 15 | 15 | 10 | 5 |
| ② GENDER | MALE | FEMALE | | | | | |
| DETERMINATION POINT | 5 | 3 | | | | | |
| ③ EARLY STAGE FUNDS | LESS THAN 1,000,000 YEN | 1,000,000 YEN OR MORE AND 5,000,000 YEN OR LESS | 5,000,000 YEN OR MORE AND 10,000,000 YEN OR LESS | 10,000,000 YEN OR MORE | | | |
| DETERMINATION POINT | 0 | 10 | 15 | 20 | | | |
| ④ MONTHLY RESERVED AMOUNT | LESS THAN 10,000 YEN | 10,000 YEN OR MORE AND 50,000 YEN OR LESS | 50,000 YEN OR MORE AND 100,000 YEN OR LESS | 100,000 YEN OR MORE | | | |
| DETERMINATION POINT | 0 | 2 | 4 | 6 | | | |
| ⑤ MANAGEMENT PERIOD | WITHIN TWO YEARS | WITHIN THREE YEARS | WITHIN FIVE YEARS | WITHIN TEN YEARS | LONGER THAN TEN YEARS | | |
| DETERMINATION POINT | 0 | 15 | 20 | 25 | 30 | | |
| ⑥ TOTAL HELD ASSETS | LESS THAN 1,000,000 YEN | 1,000,000 YEN OR MORE AND 5,000,000 YEN OR LESS | 5,000,000 YEN OR MORE AND 10,000,000 YEN OR LESS | 10,000,000 YEN OR MORE | | | |
| DETERMINATION POINT | 0 | 10 | 15 | 20 | | | |
| ⑦ ASSUMED MANAGEMENT RESULT | PORTFOLIO A | PORTFOLIO B | PORTFOLIO C | PORTFOLIO D | PORTFOLIO E | | |
| DETERMINATION POINT | 4 | 6 | 8 | 10 | 12 | | |

(b) RISK TOLERANCE ESTIMATION

| | OPTIONS | POINTS |
|---|---|---|
| ① AGE | THIRTIES | 15 |
| ② GENDER | MALE | 5 |
| ③ EARLY STAGE FUNDS | LESS THAN 1,000,000 YEN | 0 |
| ④ MONTHLY RESERVED AMOUNT | LESS THAN 10,000 YEN | 0 |
| ⑤ MANAGEMENT PERIOD | WITHIN THREE YEARS | 15 |
| ⑥ TOTAL HELD ASSETS | 1,000,000 YEN OR MORE AND 5,000,000 YEN OR LESS | 10 |
| ⑦ ASSUMED MANAGEMENT RESULT | PORTFOLIO D | 10 |
| TOTAL POINTS | | 55 |
| DETERMINATION RESULT | | 5 |

| | | MANAGEMENT PERIOD | | | | |
|---|---|---|---|---|---|---|
| | | WITHIN TWO YEARS | WITHIN THREE YEARS | WITHIN FIVE YEARS | WITHIN TEN YEARS | LONGER THAN TEN YEARS |
| ASSUMED MANAGEMENT | A (101-100.5-100) | 1 | 1 | 1 | 2 | 2 |
| | B (107-103-97) | 3 | 3 | 3 | 3 | 4 |
| | C (122-105-88) | 4 | 4 | 5 | 5 | 6 |
| | D (133-107-81) | 5 | 5 | 6 | 7 | 8 |
| | E (140-109-74) | 6 | 7 | 8 | 9 | 10 |

(b)

| | MALE IN TWENTIES | MALE IN THIRTIES | MALE IN FORTIES | MALE IN FIFTIES | MALE IN SIXTIES | MALE IN SEVENTIES |
|---|---|---|---|---|---|---|
| GENDER/AGE | +1 | +1 | 0 | 0 | −1 | −1 |
| | FEMALE IN TWENTIES | FEMALE IN THIRTIES | FEMALE IN FORTIES | FEMALE IN FIFTIES | FEMALE IN SIXTIES | FEMALE IN SEVENTIES |
| | +1 | 0 | −1 | −1 | −1 | −1 |

| | | | | |
|---|---|---|---|---|
| RATIO OF AMOUNT OF FUND TO TOTAL ASSETS | 0-25% | 25-50% | 50-75% | 75%-100% |
| | +1 | 0 | −1 | −2 |

FIG. 19

OBJECTIVE NAVIGATOR  HELP  INQUIRY  LOGIN

INVESTMENT PLAN    INTRODUCTION  SET OBJECTIVE  INVESTMENT PLAN  COMPLETE

IF YOU CHANGE INITIAL COST AND MONTHLY INVESTMENT AMOUNT, PLEASE CLICK INPUT FIELD FOR CHANGE.
RISK CAN BE CHANGED ON SLIDE. TARGET AMOUNT AND PERIOD CAN BE ADJUSTED BY DRAGGING OBJECTIVE ICON.
AFTER COMPLETION OF CHANGE AND ADJUSTMENT, PLEASE CLICK "LET'S START".

OBJECTIVE
TARGET AMOUNT: 12,000,000 YEN
TARGET ACHIEVEMENT SCHEDULE: FEBRUARY 2024
EIGHT YEARS 0 MONTHS LATER

● MERCEDES-BENZ C-CLASS AMG 4MATIC 5,780,000 YEN
○ CONDOMINIUM IN TOKYO METROPOLITAN AREA: 10,000,000 YEN

+ ADD OBJECTIVE

INITIAL INVESTMENT AMOUNT: ¥ 4,000,000
MONTHLY RESERVE INVESTMENT AMOUNT: ¥ 50,000

RISK

SUCCESSFUL    AVERAGE    NOT SUCCESSFUL

TIPS: TEXT FOR TIPS IS INPUT. TEXT FOR TIPS IS INPUT. TEXT FOR TIPS IS INPUT. TEXT FOR TIPS IS INPUT. TEXT FOR TIPS IS INPUT
TEXT FOR TIPS IS INPUT. TEXT FOR TIPS IS INPUT. TEXT FOR TIPS IS INPUT. TEXT FOR TIPS IS INPUT

OBJECTIVE SUMMARY
(NOTIFICATION DISPLAY: UPDATE DATE/TIME)

OBJECTIVE ACHIEVEMENT PORTFOLIO GENERATING DEVICE, PROGRAM, AND METHOD

TECHNICAL FIELD

The present invention relates to a technique for assisting investment and management of financial products. In particular, the present invention relates to an objective achievement portfolio generating device that is effective when applied to an investment management suggestion system for assisting operations for a financial institution or the like to give an advice or suggestion on an investment of an investor, and a program and a method used therefor.

BACKGROUND ART

In general, financial institutions, such as banks and securities firms, offer services to give an advice, a suggestion, and the like on an investment or investment management for an individual investor or the like, and a mechanism for assisting such operations using an information processing system has been proposed.

In recent years, an asset management service called "robo-advisor" for automatically performing assistance for investment or management, management of portfolios, and the like has been widely used in Europe and the United States.

As a "robo-advisor" service, for example, a service (https://www.hedgeable.com/) provided by Hedgeable, Inc. (U.S.) is known.

In such a "robo-advisor" service, when a customer responds to some questions about an investment objective, a management policy, an asset situation, and the like through a web application screen, a recommended portfolio suitable for the customer is presented depending on the content of the responses. Further, when the customer selects the investment management to be applied according to the portfolio, the customer's assets are automatically managed in accordance with the portfolio.

As a technique related to a suggestion of a recommended portfolio or an automatic management in accordance with a portfolio, for example, Patent Literature 1 discloses a method for presenting a portfolio including a combination of a plurality of financial products for a predetermined management period.

In the method described in Patent Literature 1, a plurality of market price fluctuation scenarios associated with products is systematically set in advance, and a simulation of profit and loss in the future for each of the plurality of fluctuation scenarios is made using a parameter representing a fluctuation scenario and a parameter representing a market characteristic. Then, an optimum portfolio is constructed from a set of narrowed down portfolios and the optimum portfolio is presented.

In addition, for example, Patent Literature 2 proposes a system in which risk tolerance data indicating a risk allowance level of an investor and an investment selection criterion are received from a user terminal, a list of investment destinations for including portfolios to be ranked according to the investment selection criterion is generated and displayed on the user terminal, thereby constructing a portfolio.

In addition, for example, Patent Literature 3 proposes a portfolio automatic management system capable of automatically sending an instruction for trading according to a portfolio management algorithm.

CITATION LIST

Patent Literature

Patent Literature 1: Patent Literature 1: JP 2000-293569 A
Patent Literature 2: Patent Literature 2: JP 2014-525062 A
Patent Literature 3: Patent Literature 3: JP 2008-243158 A

SUMMARY OF INVENTION

Technical Problem

However, the systems that provide a recommended portfolio as described above merely suggest a management plan by simply applying predetermined rules or the like for one or two or more financial products. There is no system that presents a plan with a specific objective, purpose, or goal for adopting the management plan.

An investment or investment management to be performed by investors, particularly, individual investors may be performed simply for the purpose of accumulation of interest. However, many investors consider an investment assuming a more specific objective or goal.

For example, some investors may consider an investment management with a specific objective or dream, such as saving a certain amount of money as a down payment to be used in several years to purchase a real estate in the future according to the life stage, or saving of money for a down payment to purchase a luxury automobile.

The number of specific objectives or goals for the investment management is not limited to one. A plurality of objectives, such as a real estate and an automobile, and retirement and a travel, is assumed in many cases.

However, in the techniques disclosed in Patent Literatures 1 to 3 described above, a combination of vague financial products or a recommended portfolio is simply presented, and it has been difficult to suggest an investment management for which specific objectives or goals as assumed by individual investors as described above are set.

Further, when a plurality of such specific objectives is set, it has also been difficult to create and suggest a single investment management plan or portfolio by incorporating a plurality of different target amounts, management periods, and the like for different objectives into the single investment management plan or portfolio, and to prepare a plurality of such portfolios and compare and review the prepared portfolios.

The present invention has been proposed to solve the problems inherent in the related art as described above. An object of the present invention is to provide an objective achievement portfolio generating device which is capable of generating a single portfolio assuming a plurality of targets as specific objectives or goals for investment management so as to flexibly satisfy various needs and the like from investors, is also capable of generating a plurality of portfolios for the same objective and easily comparing and contrasting the generated portfolios, and is suitable for an investment management suggestion system and the like for individual investors, and a program and a method used for the objective achievement portfolio generating device.

Solution to Problem

To achieve the above-mentioned object, an objective achievement portfolio generating device according to the present invention is configured as an information processing device that generates portfolio information for suggesting investment management for achievement of an objective set by a customer based on input information. The objective achievement portfolio generating device includes: objective display means for displaying predetermined objective information selectable by the customer through an input operation; interview display means for displaying predetermined interview information to which the customer is allowed to respond through an input operation; and portfolio generation/display means for generating predetermined portfolio information based on the objective information and interview information that are selected and responded to through an input operation, and causing display means of the customer to display the predetermined portfolio information in a visually recognizable manner. The portfolio generation/display means generates portfolio information for suggesting a single investment management corresponding to one or more pieces of objective information selected by the customer.

Further, the present invention can be configured as an objective achievement portfolio generation program to be executed by the objective achievement portfolio generating device in the present invention as described above.

Furthermore, the present invention can also be configured as an objective achievement portfolio generation method that can be implemented by the objective achievement portfolio generating device and objective achievement portfolio generation program according to the present invention described above.

Advantageous Effects of Invention

According to the present invention, a single portfolio assuming a plurality of targets as specific objectives or goals for investment management can be generated.

Further, a plurality of portfolios for the same objective can be generated and the generated portfolios can be easily, for example, compared and contrasted.

With this configuration, it is possible to provide an investment management suggestion system and the like, particularly, for individual investors, which flexibly satisfy various needs and the like from investors.

BRIEF DESCRIPTION OF DRAWINGS

FIG. 5 illustrates a screen that follows the screen illustrated in FIG. 4 and prompts the user to input a target amount and an objective achievement schedule for the goal selected by the user.

FIG. 6 illustrates a screen that follows the screen illustrated in FIG. 5, and displays an input target amount and objective achievement schedule in a recognizable manner and selectably presents addition/delete of an objective.

FIG. 9 illustrates a screen that follows the screen illustrated in FIG. 8 and prompts the user to input a target amount and an objective achievement schedule for a goal that is additionally selected by the user.

FIG. 10 illustrates a screen that follows the screen illustrated in FIG. 9, and displays, in a recognizable manner, an input target amount and objective achievement schedule for the added goal and further selectably presents addition/delete of an objective.

FIG. 17 is an explanatory diagram illustrating risk determination data used in the objective achievement portfolio generating device according to an embodiment of the present invention; (a) illustrates a definition table for risk determination, and (b) illustrates an example of risk tolerance estimation performed based on the definition table illustrated in (a).

FIG. 18 is an explanatory diagram illustrating another risk determination data used in the objective achievement portfolio generating device according to an embodiment of the present invention; (a) illustrates a table of recommended portfolios specified based on an assumed management (risk tolerance) and a management period, and (b) illustrates a table indicating correction values for recommended portfolios specified in (a).

FIG. 19 illustrates a display screen for presenting an investment plan generated based on objective information and interview information input by the user, as an example of a display screen generated and displayed during generation of a portfolio in the objective achievement portfolio generating device according to an embodiment of the present invention.

DESCRIPTION OF EMBODIMENTS

An embodiment of an objective achievement portfolio generating device according to the present invention will be described below with reference to the drawings.

The objective achievement portfolio generating device according to the present invention described below is implemented by processing, means, or functions to be executed by a computer according to an instruction from a program (software). The program sends a command to each component of the computer, thereby causing the computer to execute predetermined processing, function, and the like according to the present invention as described below. In other words, the processing, means, and functions in the present invention are implemented by specific means using a computer in cooperation with programs.

Note that a part or the whole of a program is supplied from, for example, a magnetic disk, an optical disk, a semiconductor memory, or any other computer-readable recording media, and the program read from the recording media is installed in a computer and executed. The program may be directly loaded into the computer through a communication line without using any recording medium, and the loaded program may be executed. The objective achievement portfolio generating device according to the present invention can be configured using a single information processing device (e.g., one personal computer), or a plurality of information processing devices (e.g., a group of a plurality of server computers).

[System Configuration]

Figure 1:
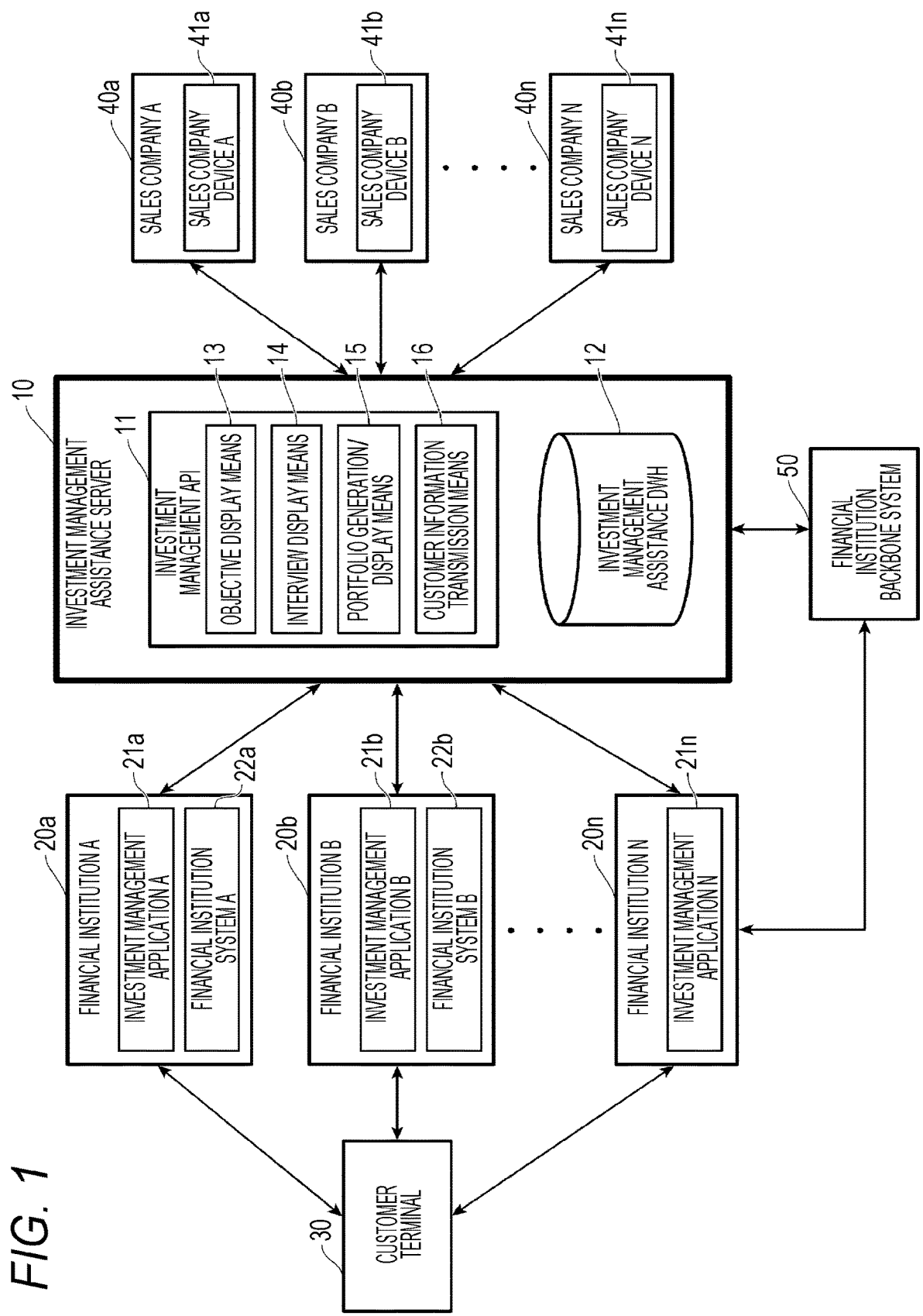
FIG. 1 is a block diagram illustrating a configuration of a system including an objective achievement portfolio generating device according to an embodiment of the present invention.

FIG. 1 illustrates a system configuration including an objective achievement portfolio generating device according to an embodiment of the present invention.

A system including the objective achievement portfolio generating device according to an embodiment of the present invention illustrated in FIG. 1 is configured as an investment management suggestion system 1 including an investment management assistance server 10, an investment management application 21 and a financial institution system 22, which are included in a financial institution 20, a customer terminal 30, a sales company device 41 included in a sales company 40, and a financial institution backbone system 50.

The investment management assistance server 10, the financial institution 20 (investment management application 21, financial institution system 22), the customer terminal 30, the sales company 40 (sales company device 41), and the financial institution backbone system 50, which constitute the investment management suggestion system 1, are connected to each other via a predetermined network, such as the Internet, so as to be capable of mutual data communication.

[Investment Management Assistance Server 10]

The investment management assistance server 10 is configured using an information processing device serving as an objective achievement portfolio generating device according to the present invention that generates portfolio information for suggesting an investment management for achieving an objective set by a customer based on input information.

Specifically, the investment management assistance server 10 can be configured using a server system composed of, for example, one or two or more server computers, or one or two or more virtual servers constructed on a cloud computing service.

The investment management assistance server 10 includes an OS (Operating System), a DBMS (Data Base Management System), and the like, which are not illustrated, and is managed as a server computer.

Further, investment management assistance server 10 includes an investment management API 11 that is implemented as software to operate on middleware such as a Web server program.

The investment management API 11 releases and provides available applications to one or two or more financial institutions 20 (20a, 20b . . . 20n) in the form of API (Application Programming Interface) via a network such as the Internet.

Thus, the financial institutions 20 call the investment management API 11 through investment management applications 21 (21a, 21b, . . . 21n), which are application programs to be managed for providing an investor or a customer (hereinafter referred to as a "user") with services, such as a suggestion or advice on an investment management, thereby enabling execution of functions of the objective achievement portfolio generating device according to the present invention.

Further, the investment management assistance server 10 includes an investment management assistance data warehouse (DWH) 12 to be implemented as a database or the like.

The investment management assistance DWH 12 is storage means for acquiring and storing predetermined information necessary for management of the objective achievement portfolio generating device according to the present invention.

Specifically, the investment management assistance DWH 12 stores, as various information resources, information about investment products sold by each financial institution 20, attribute information about users of each financial institution 20, history information about account transactions, access history information, and the like.

The investment management assistance DWH 12 also stores predetermined information necessary for Implementation and management of the investment management API 11. Necessary information is read, as needed, when the investment management API 11 is executed, and the information is stored and updated.

Specifically, information about the portfolio corresponding to the risk level prepared by the financial institution 20 is stored and held as information for each financial institution in the investment management assistance DWH 12.

Risk determination data, risk correction data, and the like corresponding to one or two or more portfolios are also stored and held in the investment management assistance DWH 12 as information for each financial institution (see FIGS. 17 and 18).

Note that the information accumulated in the investment management assistance DWH 12 as described above can periodically be extracted by daily processing or the like from, for example, the own financial institution system 22 as an accounting system/information system information processing included in the financial institution 20, or the financial institution backbone system 50 for providing the accounting system/information system information processing to the plurality of financial institutions 20. The extracted information can, then, be acquired and accumulated by the investment management assistance DWH 12 (see FIG. 1).

Further, when the own information processing system, an external backbone system, or the like with which the financial institutions 20 can cooperate is not included, various information can be, for example, manually registered and accumulated in the investment management assistance DWH 12. In addition, for example, performance information such as the past price movement or rating for each brand may be acquired from an external data source and the acquired information may be accumulated. The information accumulated in the investment management assistance DWH 12 can be acquired and referenced in another program (e.g., the investment management application 21 of the financial institution 20) via the investment management API 11.

The investment management API 11 included in the investment management assistance server 10 as described above is specifically configured to function as an objective display means 13, interview display means 14, portfolio generation/display means 15, and customer information transmission means 16 as illustrated in FIG. 1.

The objective display means 13 is means for displaying predetermined objective information selectable by the user or the like through an input operation.

The interview display means 14 is means for displaying predetermined interview information to which the user or the like can respond through an input operation.

The portfolio generation/display means 15 is means for generating predetermined portfolio information based on the objective information and interview information which is selected and responded to through an input operation and displaying the predetermined portfolio information on display means of the user in a visually recognizable manner. In particular, the portfolio generation/display means 15 is configured to generate portfolio information for suggesting a single investment management corresponding to a plurality of pieces of objective information selected by the user or the like.

The term "portfolio information" used herein refers to investment management information to be presented for user investment management. Examples of the portfolio information include a graph or table representing an investment plan for allowing a target amount to be achieved on or before an objective achievement due date, and a graph or table representing a combination of financial products and the ratio thereof when assets are distributed to a plurality of financial products for investment (see FIGS. 19 to 22 etc.).

The customer information transmission means 16 is means for transmitting predetermined information about the user or the like associated with the generated portfolio information to the sales company device 41 of the sales company 40 to be described below as an external device related to at least of the plurality of pieces of objective information included in the portfolio information generated by the portfolio generation/display means 15 described above.

The specific functions and operations of each means implemented by the investment management API 11 will be described below with reference to a display screen example output and displayed to the customer terminal 30 (see FIGS. 2 to 31).

[Financial Institution 20, Financial Institution Backbone System 50]

Each financial institution 20 is a financial institution, an investment corporation, or the like, such as a bank or a securities firm, and includes an information processing device to be connected to the investment management assistance server 10 so as to be capable of mutual data communication. The information processing device implements and manages the investment management application 21.

In the example illustrated in FIG. 1, the investment management applications 21$a$, 21$b$, ... 21$n$ can manage the plurality of financial institutions 20$a$, 20$b$, ... 20$n$, respectively.

In each financial institution 20, an application supplied from the investment management API 11 of the investment management assistance server 10 described above can be executed through the investment management application 21. Thus, each financial institution 20 calls the investment management API 11 through the investment management application 21 (21$a$, 21$b$, ... 21$n$) as an application program for providing a suggestion, advice, or the like on an investment management for its own user, thereby enabling execution of functions of the objective achievement portfolio generating device according to the present invention.

Further, each financial institution 20 includes its own financial institution system 22, or the external financial institution backbone system 50 stores and manages information about investment products sold by each financial institution 20, attribute information about users of the financial institution 20, history information about account transactions, access history information, and the like.

In the example illustrated in FIG. 1, a financial institution A20a and a financial institution B20b include their own financial institution system A22a and financial institution system B22b, respectively, and a financial institution N20n includes the external financial institution backbone system 50.

The financial institution system 22 and the financial institution backbone system 50 are each configured as an accounting system/information system information processing system included in the corresponding financial institution 20.

Further, the financial institution backbone system 50 is configured and managed by a huge server system group owned by an information system company so-called a system integrator which undertakes, for example, the financial institution data system management as an operation in response to a demand of outsourcing of one or two or more financial institutions and. As the financial institution backbone system 50, a securities core system (STAR (registered trademark)) and bank financial product intermediation system (BESTWAY (registered trademark)) which are managed by NOMURA RESEARCH INSTITUTE, LTD., and the like are known.

[Customer Terminal 30]

The customer terminal 30 is an information processing device that can be used by the user (customer, investor) of the financial institution 20 and is composed of, for example, a PC, a mobile terminal, or a smartphone (see FIG. 31) owned by the user, or a PC or a dedicated terminal device installed in the financial institution 20.

The user operates the customer terminal 30 to access and start the investment management applications 21 (21a, 21b, . . . 21n) provided by the financial institutions 20 (20a, 20b, . . . 20n), respectively, thereby making it possible to call the investment management API 11 of the investment management assistance server 10 through the investment management application 21 and executing and using the functions and services provided by the objective achievement portfolio generating device according to the present invention.

In this manner, the user according to this embodiment uses the customer terminal 30 to access the investment management application 21, which is composed of a web application or the like provided by the financial institution 20 used by the user via the Internet, thereby enabling use of portfolio construction/management services.

However, the configuration of this embodiment is not limited the configuration described above. For example, a configuration in which the investment management application 21 is introduced into the customer terminal 30 and the investment management server corresponding to the investment management application 21 is introduced into each financial institution may be employed. In this case, the investment management application 21 of the customer terminal 30 accesses the investment management assistance server 10 through the investment management server of the corresponding financial institution.

For example, the application corresponding to the investment management application 21 is introduced into the information processing terminal, such as a PC, which is owned by the user, to directly access the investment management assistance server 10 without passing through the financial institution 20, thereby enabling use of a portfolio construction service.

[Sales Company 40]

The sales company 40 is a company that provides and sells products, services, and the like as objectives or goals of investment management, such as a real estate company, an imported automobile dealer, or a condominium developer. The sales company 40 includes sales company devices 41 as information processing devices connected to the investment management assistance server 10 so as to be capable of mutual data communication.

In the example illustrated in FIG. 1, the plurality of sales companies 40a, 40b, . . . 40n includes sales company devices 41a, 41b, . . . 41n, respectively.

Further, predetermined information about the user associated with the generated portfolio information is transmitted from the investment management assistance server 10 to the sales company device 41 of each sales company 40 related to a plurality of pieces of objective information included in the portfolio information generated by the portfolio generation/display means 15 of the investment management API 11.

For example, when the user whose objective is to purchase a real estate or an imported automobile in the future performs the portfolio generation or the like for achieving the objective on the investment management assistance server 10, information about the user is transmitted and notified to the sales company device 41 of the sales company 40, which is the relevant real estate company or automobile dealer, and information, such as, the name, address, phone number, mail address, target product, target amount of money, and target amount is provided.

Figure 30:
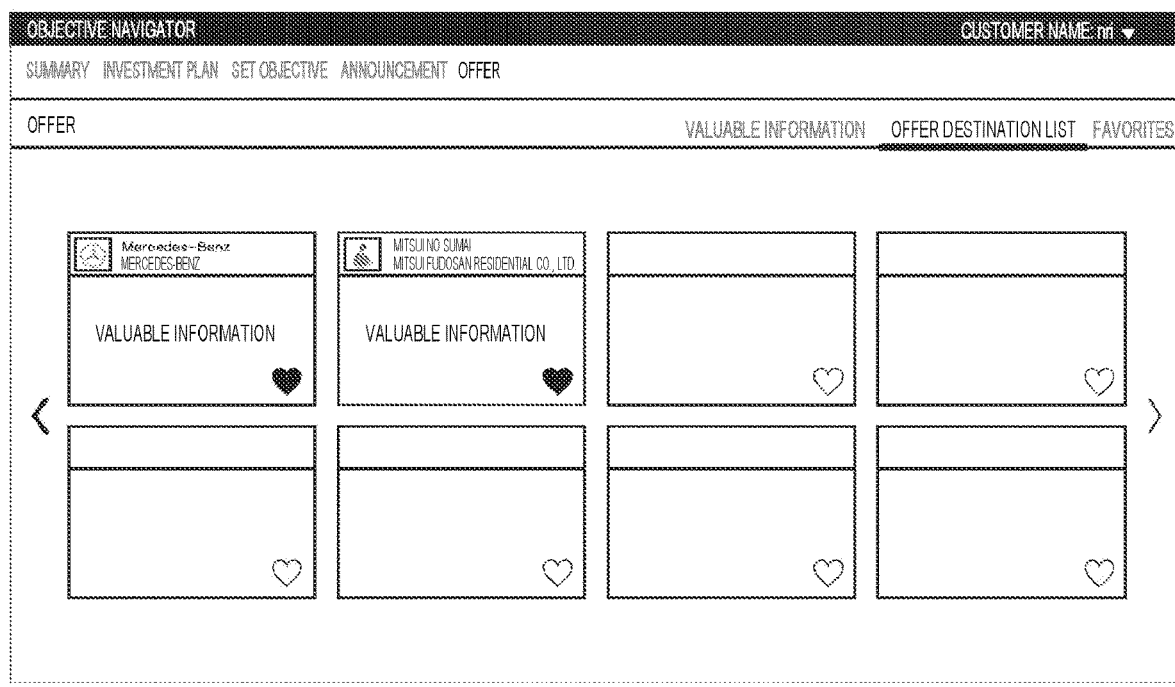
FIG. 30 illustrates a screen for displaying a list of information supplied from a sales company corresponding to objective information registered by the user, as an example of a display screen generated and displayed during generation of a portfolio in the objective achievement portfolio generating device according to an embodiment of the present invention.

As a result, the sales company 40 that has received the user information can perform promotion activities, such as promotion and advertising, on the user (see FIG. 30).

Note that the transmission and provision of user information to the sales company 40 are executed after the user's permission or acknowledgement is received in advance.

As the user information provided to the sales company 40, only specific information (e.g., mail address) can be provided by the user's selection, setting, or the like, and important information, such as an address or phone number, is prevented from being provided.

[Operation]

A specific operation (objective achievement portfolio generation method) of a system including the objective achievement portfolio generating device according to this embodiment having the configuration as described above will be described with reference to FIGS. 2 and 3 to 31.

Figure 2:
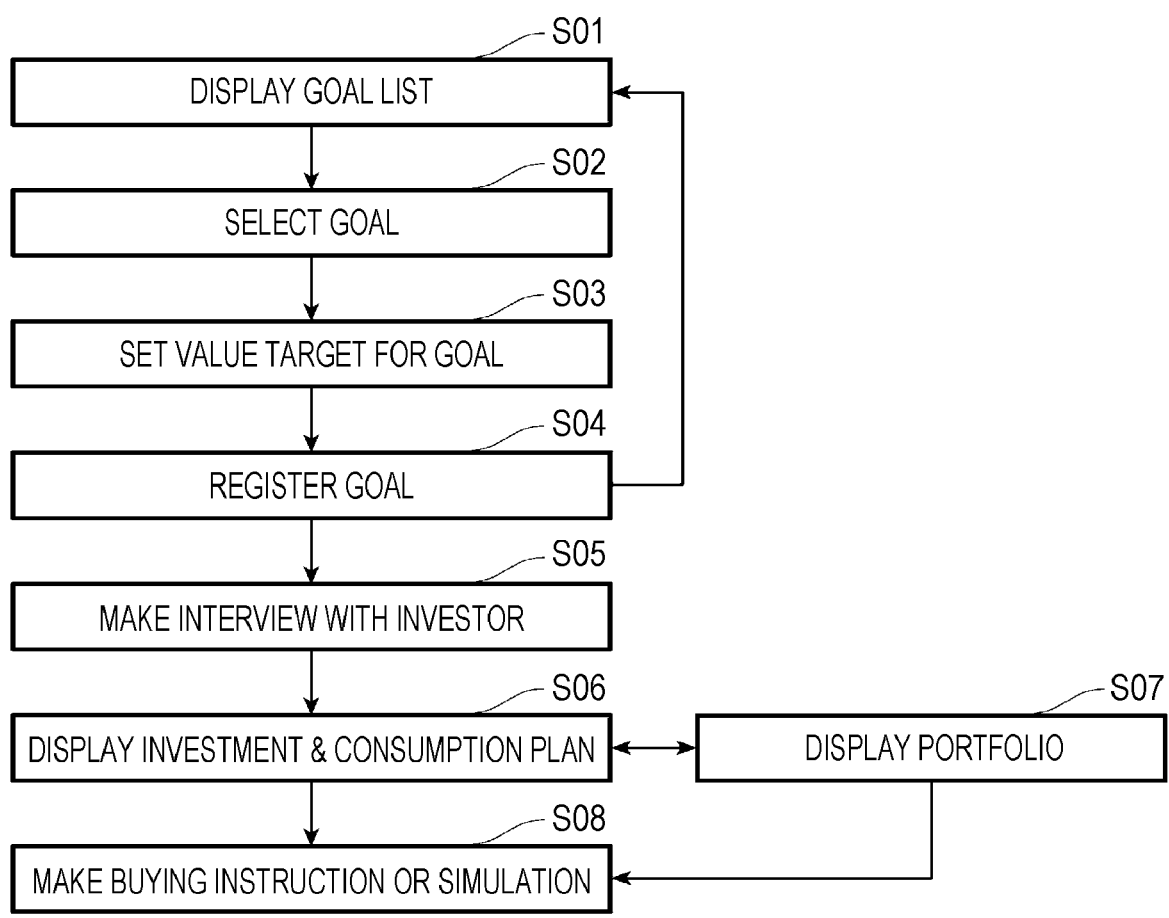
FIG. 2 is a flowchart illustrating a procedure for generating a portfolio in the objective achievement portfolio generating device according to an embodiment of the present invention.

FIG. 2 is a flowchart illustrating an example of an operation of a system including the objective achievement portfolio generating device according to this embodiment.

The following operation is executed and managed by the investment management API 11 (objective display means 13, interview display means 14, portfolio generation/display means 15, customer information transmission means 16), which is read out from the customer terminal 30 through the investment management application 21, and the investment management assistance DWH.

First, the user operates the customer terminal 30 to access the investment management application 21 (21a, 21b, . . . 21n) provided by the financial institution 20 (20a, 20b, 20n) with which the user does business. In this case, the user inputs a user ID or password assigned to the user, thereby enabling the user to log in the investment management application 21.

The investment management API 11 of the investment management assistance server 10 is called through the logged-in investment management application 21, and functions and services provided by the objective achievement portfolio generating device according to the present invention can be used as follows.

As illustrated in FIG. 1, a goal list is displayed as objective information according to the present invention on the customer terminal 30 which has logged in the investment management application 21 (step S01).

Figure 3:
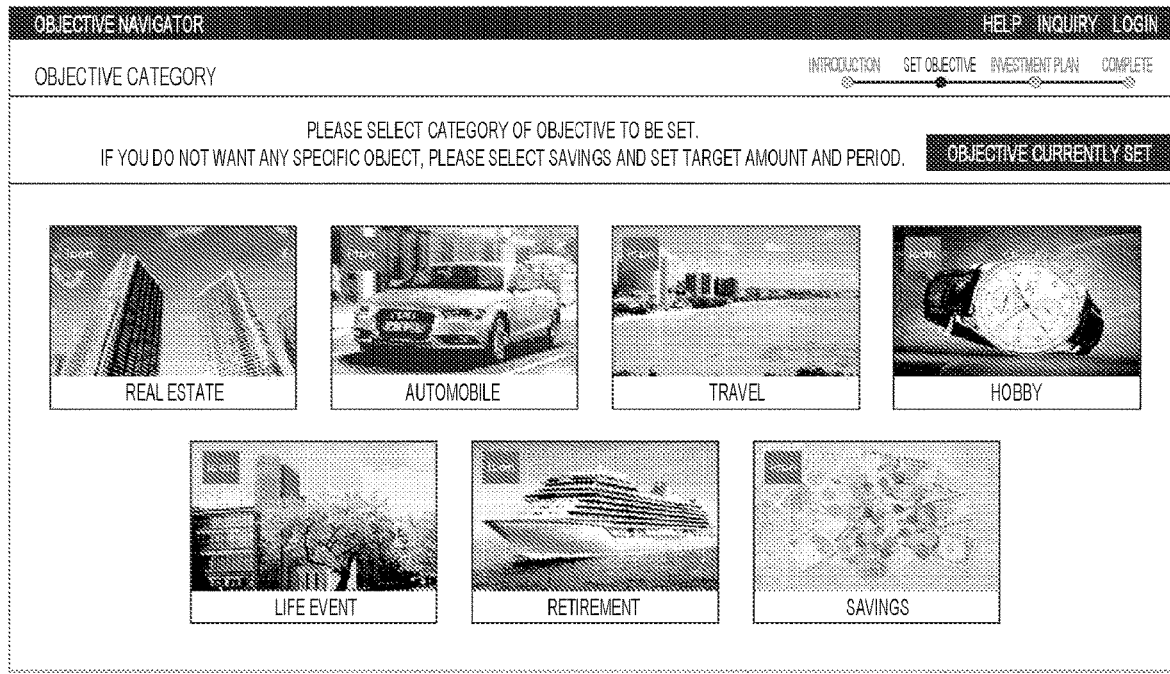
FIG. 3 illustrates a screen for selectably presenting to a user a goal list of specific objects for investment management, as an example of a display screen generated and displayed during generating a portfolio in the objective achievement portfolio generating device according to an embodiment of the present invention.

As the goal list, for example, a display screen as illustrated in FIG. 3 is presented.

In the example illustrated in FIG. 3, seven items, i.e., real estate, automobile, travel, hobby, life event, retirement, and savings, are displayed as objective information selectable by the user through an input operation on the customer terminal 30. Accordingly, the user can select any one of the pieces of objective information as a goal depending on the objective and purpose of the user's investment management (step S02).

Figure 4:
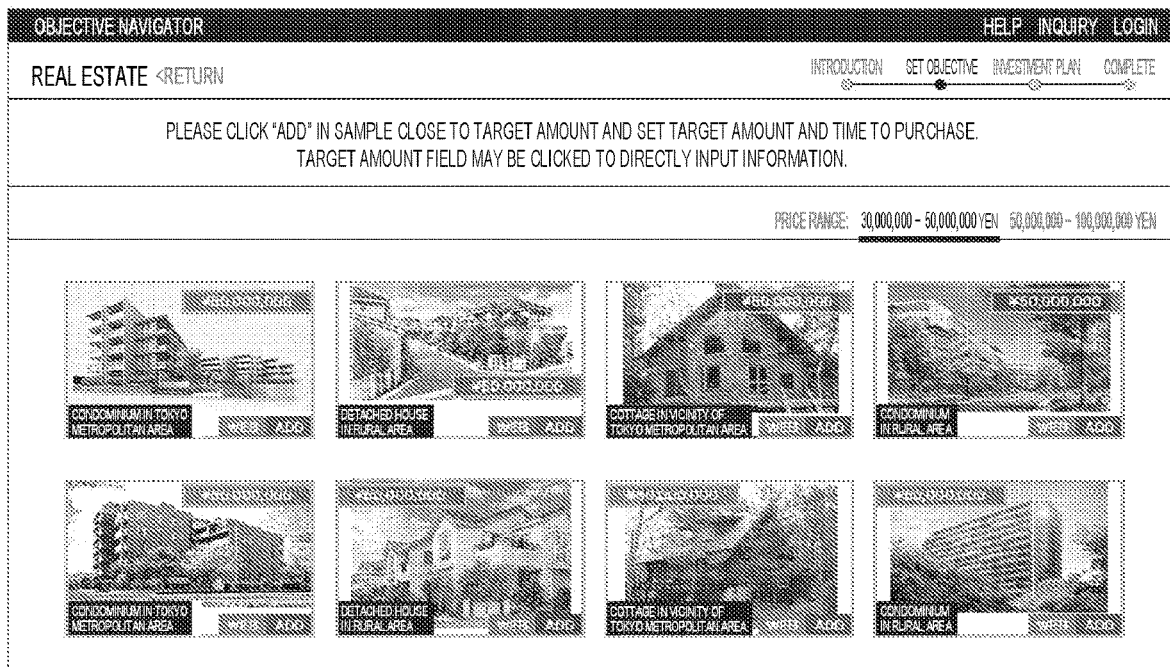
FIG. 4 illustrates a screen that follows the screen illustrated in FIG. 3 and selectably presents a more specific goal list belonging to a category (real estate) selected from the goal list.

When any one of the goals (objective information) is selected according to a user's input operation, as illustrated in FIG. 4, a more specific goal list belonging to the selected category is selectably presented.

In the example illustrated in FIG. 4, when the user selects "real estate" from the goal list illustrated in FIG. 3, eight items including condominium, detached house, and cottage depending on the price, location, and the like are displayed as a more specific real estate. Accordingly, the user can select any one of the pieces of real estate information as a more specific object or goal of the user's investment management (step S02).

When the specific goal (real estate) is selected according to a user's input operation, then, as illustrated in FIG. 5, a screen for setting a value objective for the selected goal is displayed (step S03).

In the example illustrated in FIG. 5, when the user selects the goal "condominium/Tokyo metropolitan area/50,000,000 yen" from the screen illustrated in FIG. 4, the content of the selected goal is displayed and a screen for causing the user to input the target amount and objective achievement schedule for the goal (condominium) is displayed. This embodiment illustrates an example in which the user inputs "target amount: 10,000,000 yen", "objective achievement schedule: eight years and zero months".

In a lower field of the display screen, select buttons (icons) indicating "add an objective" and "enter", respectively, are displayed, and the subsequent processing is executed according to a user's input operation.

When the user inputs the target amount/objective achievement schedule item and selects "enter", as illustrated in FIG. 6, the input target amount and objective achievement schedule are displayed to enable the user to check the target amount and objective achievement schedule and a screen for presenting the addition/delete of an objective is selectably displayed.

Specifically, in a right end field for a displayed target amount/objective achievement schedule, a select button (icon) "DELETE" is displayed and the already input objective information can be deleted according to a user's input operation.

In a lower field of the display screen, select buttons (icons) indicating "add objective" and "proceed with the investment plan for this objective" respectively are displayed and the subsequent processing is executed according to a user's input operation. Accordingly, the user can arbitrarily add an objective on his/her own choice or judgement.

After completion of the objective setting, the processing may proceed to the subsequent investment plan creation processing.

A case where the user selects "add objective" will now be described.

Figure 7:
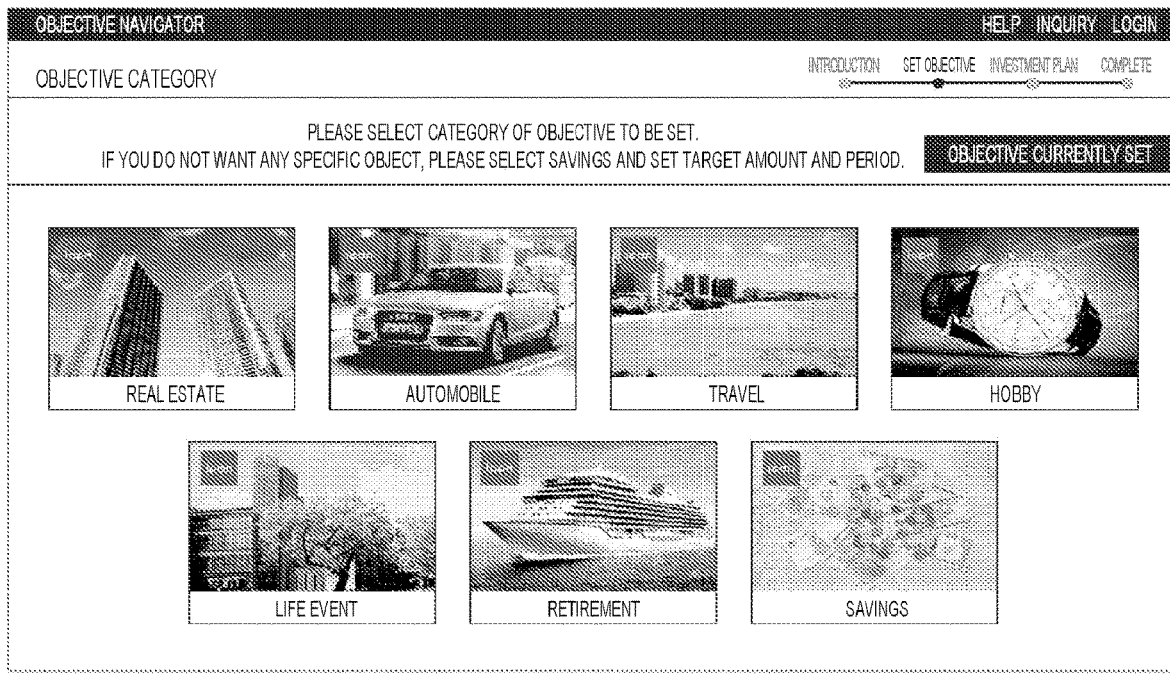
FIG. 7 illustrates a screen that follows the screen illustrated in FIG. 6 and displays a goal list similar to that illustrated in FIG. 3 again when the addition of an objective is selected.

When the user selects "add objective" on the screen illustrated in FIG. 6, as illustrated in FIG. 7, a screen for selectably displaying a plurality of pieces of objective information is presented again. The screen illustrated in FIG. 7 is the same as the screen illustrated in FIG. 3 described above.

Accordingly, the user can select any one of the pieces of object information as an additional objective or goal (step S02). For example, the user can also select "real estate" again as an additional objective (see FIGS. 3 and 4) and can also select other objectives.

A case where the user selects "automobile" as a second objective will now be described.

Figure 8:
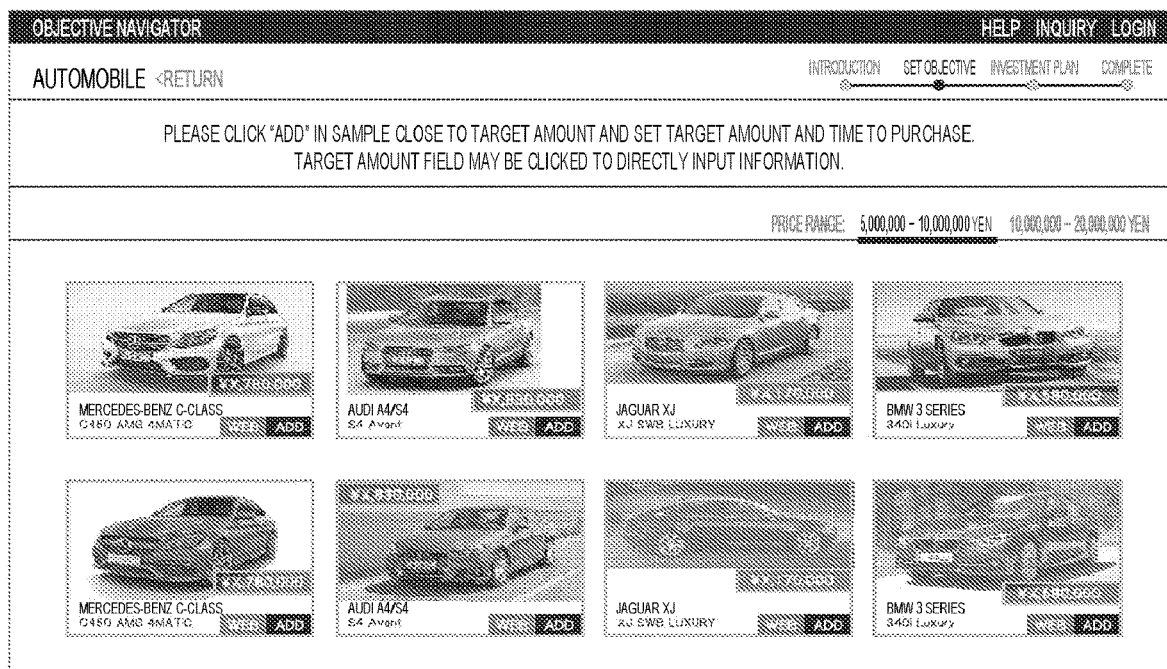
FIG. 8 illustrates a screen that follows the screen illustrated in FIG. 7 and selectably presents a more specific goal list belonging to a category (automobile) selected from the goal list.

When the goal (automobile) is selected according to a user's input operation, as illustrated in FIG. 8, a more specific goal list belonging to the selected category is selectably presented.

In the example illustrated in FIG. 8, since the user selects "automobile" from the goal list illustrated in FIG. 7 (FIG. 3), a plurality of (eight) automobiles of different manufacturers, automobile types, and the like is displayed as more specific automobiles. Accordingly, the user can select any one of the pieces of automobile information as the user's object or goal (step S02).

When "automobile" is selected as a specific goal according to a user's input operation, then, as illustrated in FIG. 9, a screen for setting a value object for the selected goal is displayed (step S03), as in the case of FIG. 5 described above.

In the example illustrated in FIG. 9, when the user selects the goal "Mercedes-Benz C-Class, C450AMG4MATIC, X780,000 yen" from the screen illustrated in FIG. 8, the content of the selected goal is displayed and a screen for prompting the user to input the target amount and objective achievement schedule for the goal (automobile). A case where the user inputs "target amount: 20,000,000 yen", "objective achievement schedule: four years and zero months" will now be described.

When the user inputs the item for the target amount/objective achievement schedule and selects "enter", as illustrated in FIG. 10, the input target amount and objective achievement schedule are displayed so as to enable the user to check the target amount and objective achievement schedule and a screen for selectably presenting the addition and deletion of the objective is displayed.

In this case, a plurality of pieces of objective information is displayed in parallel on the same screen so that the user can check all the first objective information (real estate) previously selected and input and the second objective information (automobile).

Also, at this stage, the user "deletes" the already input objective information according to a user's input operation, as in the case illustrated in FIG. 6 described above, and the user can select "add objective" and "proceed with the investment plan for this objective" in the lower field of the display screen.

A case where the user selects "proceed with the investment plan for this objective" will now be described.

When the user selects "proceed with the investment plan for this objective", the already input or set one or two or more pieces of objective information (two pieces of objective information "real estate" and "automobile" in the example described above) are registered as a single or common goal (step S04).

This registered information is stored and held as information for each user in the investment management assistance DWH 12 of the investment management assistance server 10 through the customer terminal 30 and the investment management application 21.

Accordingly, the user who has registered the objective information can read out one or two or more pieces of objective information, which is set and registered by the user, at any timing thereafter and can refer to, process, or change the objective information.

Note that the user may perform only the objective information goal registration (step S04). In this case, the processing returns to step S01 (FIG. 2) illustrated in FIGS. 3 and 7 described above, thereby eliminating the need for generating an investing plan or portfolio as described below and inputting and responding to interview information for generating an investing plan or portfolio.

In this case, the previously registered objective information can be read out and used to generate an investment plan or portfolio later.

When the objective information is registered (step S04) and the processing proceeds to the subsequent investment plan/portfolio generation processing, a plurality of display screens on which the user can respond through an input operation as information interview according to the present invention is displayed on the customer terminal 30.

The user responds through an input operation according to the display screens, thereby conducting an interview for investment (step S05).

Examples of the interview information to which the user is responded include individual attribute information such as the age, gender, initial investment amount, a monthly reserve investment amount, and risk tolerance. When the user is asked questions about these pieces of information, responses are made to the questions and the responses are collected.

Specifically, in this embodiment, for example, display screens as illustrated in FIGS. 11 to 16 are presented as interview information display screens. The plurality of screens transit to the subsequent screen after a response to the interview information on the preceding screen is input and completed, and the screen can be returned to the already responded screen through a user's operation "return to the previous question".

Figure 11:
FIG. 11 illustrates a screen that follows the screen illustrated in FIG. 10 and prompts the user to input interview information by causing the user to respond to questions about the age and gender of the user.

First, a screen for prompting the user to respond to questions about his/her age and gender on the screen illustrated in FIG. 11.

Figure 12:
FIG. 12 illustrates a screen that follows the screen illustrated in FIG. 11 and prompts the user to input interview information by causing the user to respond to a question about the amount of fund for an initial investment.

When a response is made on the screen illustrated in FIG. 11 and "next" is selected, a screen for responding to the amount of an initial investment fund is displayed on the screen illustrated in FIG. 12.

Figure 13:
FIG. 13 illustrates a screen that follows the screen illustrated in FIG. 12 and prompts the user to input interview information by causing the user to respond to a question about the amount of a monthly reserve investment.

When a response is made on the screen illustrated in FIG. 12 and "next" is selected, a screen for responding to the amount of a monthly reserve investment is displayed on the screen illustrated in FIG. 13.

Figure 14:
FIG. 14 illustrates a screen that follows the screen illustrated in FIG. 13 and prompts the user to input interview information by causing the user to respond to a question about a period of fund management.

When a response is made on the screen illustrated in FIG. 13 and "next" is selected, a screen for making a response about the period for fund management is displayed on the screen illustrated in FIG. 14.

Figure 15:
FIG. 15 illustrates a screen that follows the screen illustrated in FIG. 14 and prompts the user to input interview information by causing the user to respond to a question about a percentage of an investment amount with respect to financial assets held by the user.

When a response is made on the screen illustrated in FIG. 14 and "next" is selected, a screen for making a response about the percentage of the investment amount with respect to the held financial assets is displayed on the screen illustrated in FIG. 15.

In the example illustrated in FIG. 15, the amount of investment assumed by the user can be selected from five options, i.e., 10% or less, 30% or less, 50% or less, more than 50%, and 100% of the financial assets held by the user.

Specifically, in this embodiment, the user is prompted to respond to a question about whether the investment fund estimated and managed using the system is 50%, 10%, or 100% of the financial assets held by the user. Responding to the question enables change of a risk tolerance to be described below. For example, the determination may be made in such a manner that, if the investment fund is "100%", the investment fund corresponds to the entire financial assets held by the user, it is considered better to avoid risk and thus the risk tolerance is set to a lower value, whereas if the investment fund is "10%", it is considered better to take a risk and thus the risk tolerance is set to a higher value.

Further, responding to the question as described above enables estimation and recognition of the amount of other financial assets held by the user. For example, services or suggestions for, for example, encouraging the user who has returned a response "10%" to further increase the amount of investment can be made.

Figure 16:
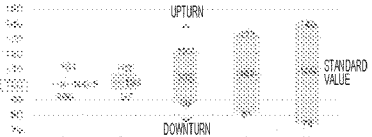
FIG. 16 illustrates a screen that follows the screen illustrated in FIG. 15 and prompts the user to select a risk tolerance of investment management.

When a response is made on the screen illustrated in FIG. 15 and "next" is selected, a screen for prompting the user to select the risk tolerance of the investment management is displayed on the screen illustrated in FIG. 16.

In the example illustrated in FIG. 16, five risk levels A to E are presented as risk levels (tolerances) that can be allowed by the user and the user can select any one of the risk levels.

This example illustrates the upper limit and the lower limit of management profit and loss when one million yen is managed for one year for each of risk levels A to E. The risk level A indicates the case of lowest risk/lowest return, and the risk level E indicates the case of highest risk/highest return.

Different portfolios are applied so as to correspond to the risk levels A to E, respectively.

In other words, in this embodiment, a plurality of portfolios is prepared according to the risk level. Further, the risk levels (portfolios) can be arbitrarily set, for example, 5 levels, 10 levels, or 20 levels, and can be prepared and changed for each financial institution 20.

Preferably, a plurality of portfolios is individually prepared for each financial institution 20 according to the risk level and the information is stored and held in the investment management assistance DWH of the investment management assistance server 10 through the financial institution system 22 or the financial institution backbone system 50.

Note that a portfolio may be composed of one fund or a plurality of funds, like fund wrap. In addition, other functions, such as Bitcoin or real estate, may be used as long as a return that is commensurate with the risk can be obtained.

In this embodiment, a recommended portfolio is extracted and entered as an optimum investment plan for the user from a plurality of portfolios based on the risk level (tolerance) selected and allowed by the user and the interview information to which the user has responded.

A method for entering a risk level (tolerance) and a recommended portfolio will now be described.

FIG. 17 is an explanatory diagram illustrating risk determination data used in the objective achievement portfolio generating device according to an embodiment of the present invention; (a) illustrates a definition table for risk determination, and (b) illustrates an example of risk tolerance estimation performed based on the definition table illustrated in (a).

As illustrated in FIG. 17(a), the risk levels can be allocated using predetermined points as point allocation according to the interview information obtained from the user, e.g., the age, gender, initial fund, monthly reserved amount, management core, held total assets, and assumed management result (a portfolio type based on a risk tolerance) of the user.

Further, the risk tolerance recommended for each user can be calculated and determined based on the definition table as described above.

Specifically, as illustrated in FIG. 17(b), for example, if information about the user includes age: thirties, gender: male, initial fund: less than one million yen, monthly reserved amount: less than ten thousand yen, management period: within three years, held total assets: one million yen or more and less than five million yen, assumed management result (risk tolerance): portfolio D, total points are "55". For the point allocation result, "5" can be allocated as a determination result (risk tolerance). Accordingly, the portfolio corresponding to the risk tolerance "5" can be presented to the user as a recommended portfolio.

Note that the type of the determination result (risk tolerance) to be allocated can be arbitrarily set with respect to the total points based on the determination table as described above.

For example, the risk level may be set to the level "5", the level "10", or the level "20" for each financial institution, or depending on the number or type of prepared portfolios. A method for calculating the risk level from the total points can be arbitrarily determined depending on the risk levels.

Further, a recommended portfolio can be selected using data as illustrated in FIG. 18.

FIG. 18 is an explanatory diagram illustrating another risk determination data used in the objective achievement portfolio generating device according to an embodiment of the present invention; (a) illustrates a table of recommended portfolios specified based on an assumed management (risk tolerance) and a management period, and (b) illustrates a table indicating correction values for recommended portfolios specified in (a).

In the example illustrated in FIG. 18(a), one of the portfolios 1 to 10 can be extracted and specified from the assumed managements A to E (risk tolerances) selected by the user and the management periods assumed by the user. The portfolios 1 to 10 illustrated herein are allocated in such a manner that a risk becomes higher as the number increases. The portfolio "1" has a lowest risk (low risk, low return) and the portfolio "10" has a highest risk (high risk, high return).

Note that the assumed managements A to E (risk tolerances) selected by the user are used herein, but instead a list of risk tolerances and management periods obtained in FIG. 17(b) described above can be used.

Further, correction values are applied to the specified portfolio, for example, for each gender or age of the user, or for each investment ratio to the total assets, as illustrated in FIG. 18(b), thereby extracting a final recommended portfolio.

For example, for the user of gender/age: male/thirties, assumed management (risk tolerance): D, and the management ratio to the held total assets: 25-50%, the portfolio "5" is extracted as illustrated in FIG. 18(a) and correction values "+1" and "0" are applied to the portfolio as illustrated in FIG. 18(b), thereby making it possible to present the portfolio "6" as a recommended portfolio.

Note that the content of an item or question in which the risk tolerance is corrected as illustrated in FIG. 18(b) can be flexibly set and changed.

The data and table for determining the risk tolerance and recommended portfolio as described above can be prepared for each financial institution and preliminarily stored in the investment management assistance DWH 12 of the investment management assistance server 10.

Further, the investment plan/portfolio based on the recommended portfolio selected as described above is generated and is displayed as an investment & consumption plan suggested to the user (step S06).

The generation of portfolio information including the investment plan/portfolio is executed by portfolio generation/display means of the investment management API 11.

FIG. 19 illustrates a display screen that is generated based on the objective information and the interview information input by the user. The content of the target amount corresponding to FIGS. 3 to 8 described above is recommended and suggested to the user having the real estate: ten million yen and an automobile: the total amount of twelve million yen including two million yen, the estimated objective achievement date: after eight years and zero months from the present time, i.e., February 2024, the initial investment amount: four million yen, the monthly reserve investment amount: fifty thousand yen, and the risk level: 3.

As is obvious from FIG. 19, a single investment management plan is presented to a plurality of objectives (real estate, automobile) as the investment plan that is used as portfolio information generated and presented in this embodiment. Specifically, the assets are increased for four years from the start of the management, and if an automobile, which is one of the plurality of objectives, is purchased four years later, i.e., in February 2020, the assets will temporarily decrease and then increase again. The target amount of ten million yen for purchasing the real estate, which is another one of the objectives, can be achieved in February 2022, which is about two years earlier than the final objective achievement schedule.

In this manner, a single (common) investment plan is generated and presented for a plurality of specific objectives and goals set by the user, thereby enabling the user to obtain the future investment management plan in a recognizable and simple form and increasing an incentive to the investment and investment management.

In addition, the portfolio corresponding to the investment plan illustrated in FIG. 19 can be displayed (step S07).

Figure 20:
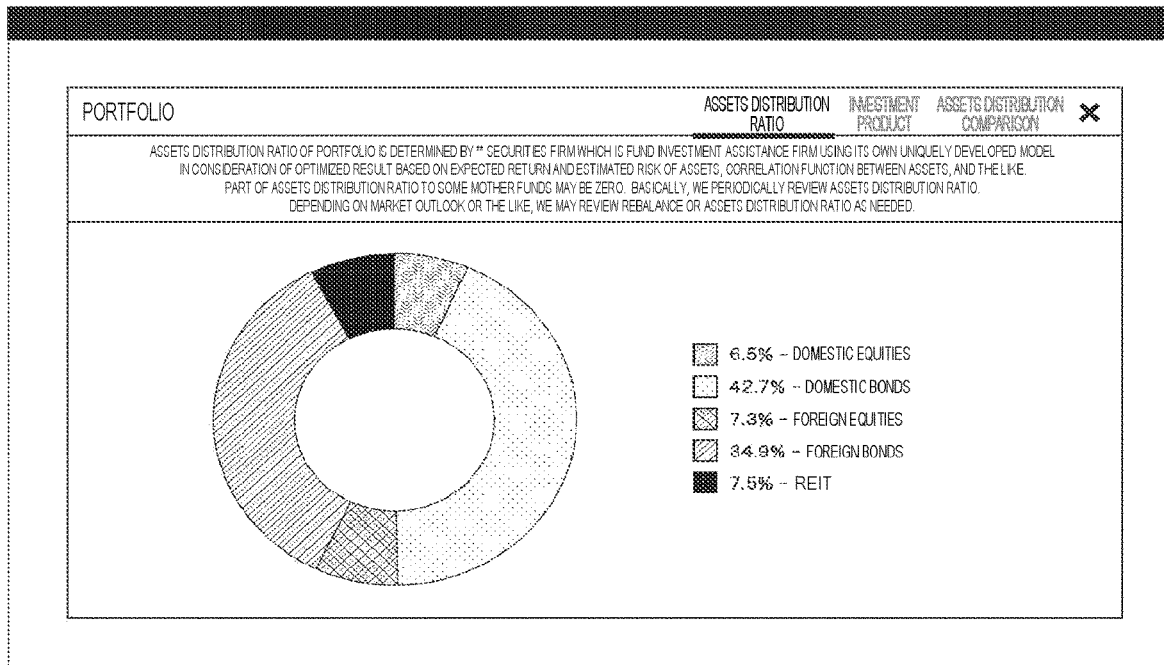
FIG. 20 illustrates a screen for presenting the portfolio corresponding to the investment plan presented in FIG. 19.

Specifically, when a select button (icon) "portfolio" in a lower right field of the investment plan display screen illustrated in FIG. 19 is selected, as illustrated in FIG. 20, the portfolio indicating a distributed investment ratio and the like of a plurality of financial products for realizing the investment plan is displayed. This enables the user to display and check the specific investment distribution ratio and the like in a simple and recognizable form for the investment management presented as the investment plan.

Further, based on the presented investment plan/portfolio described above, an actual buying instruction or simulation can be carried out (step S08).

The buying instruction can be carried out by transmitting a message on the system from the investment management assistance server 10 to the financial institution system 22 of the financial institution 20 and the financial institution backbone system 50 (the above-mentioned securities core system, bank financial products intermediation system, and the like).

A simulation is carried out by virtually performing investment management without actually investing money, i.e., without carrying out the buying instruction, based on the generated investment plan/portfolio.

The simulation and the setting content (scenario) for which the investment management is actually performed are registered and stored in the investment management assistance DWH of the investment management assistance server 10.

Accordingly, the management on simulations can be switched to the actual investment management, and the actual investment management can be replaced by the management on simulations.

Further, the registered and stored scenario can be copied and the copy can be used to generate another investment plan/portfolio. For example, the content of the copied scenario can be appropriately corrected by the user. For example, a plan change, such as changing of only the risk tolerance, or changing of the objective achievement period, can be made.

Specifically, for example, when a scenario 1 and a scenario 2 (another suggested scenario with a risk tolerance different from that of the scenario 1) created in March 2016 are set and registered, the scenario 1 created at that time is selected and the user compares the scenario 1 with the scenario 2 two years later, i.e., in March 2018. In a case where the performance in the scenario 1 is superior than the performance in the scenario 2 and the objective is already reached, the user can perform the management by switching the scenario 1 to the scenario 2 as of March 2018. In the case described above, not only the complete switching from the scenario 1 to the scenario 2, but also transfer of half the management assets to the scenario 2 can be performed, while half the management assets are left in the scenario 1.

Further, such an investment plan/portfolio can be presented and released to a person other than the user.

For example, only the risk tolerance can be changed based on the scenario of the investment plan/portfolio illustrated in FIGS. 19 and 20.

Figure 21:
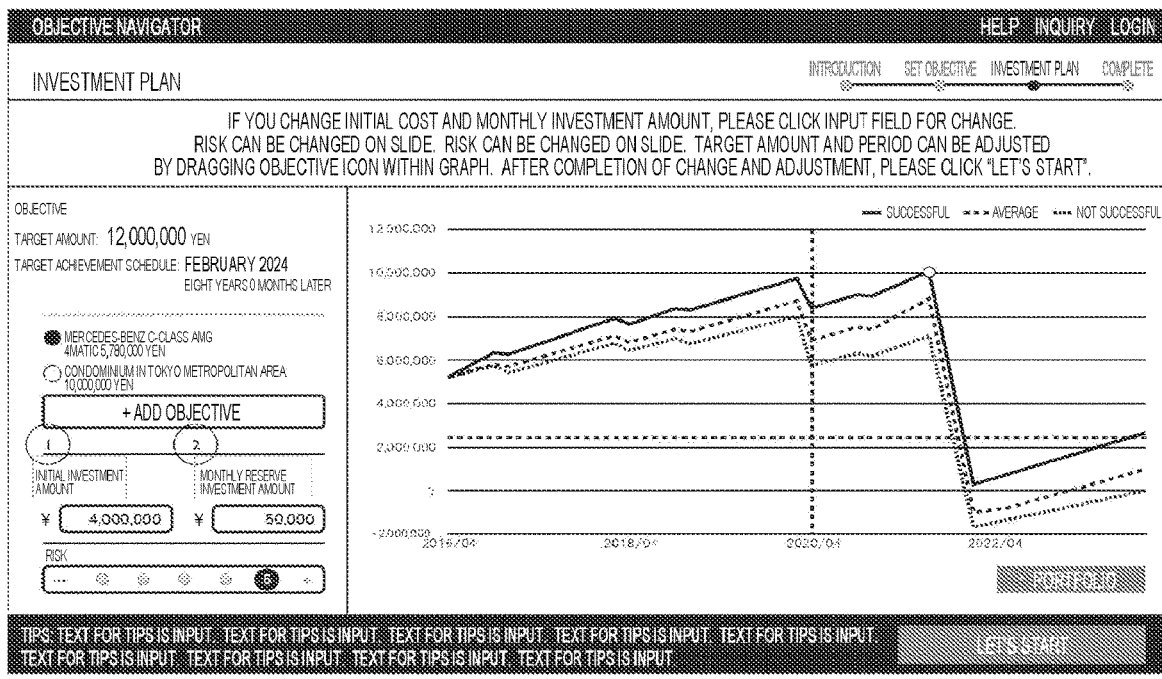
FIG. 21 illustrates a screen for presenting another investment plan generated by changing the risk tolerance for the investment plan presented in FIG. 19.
Figure 22:
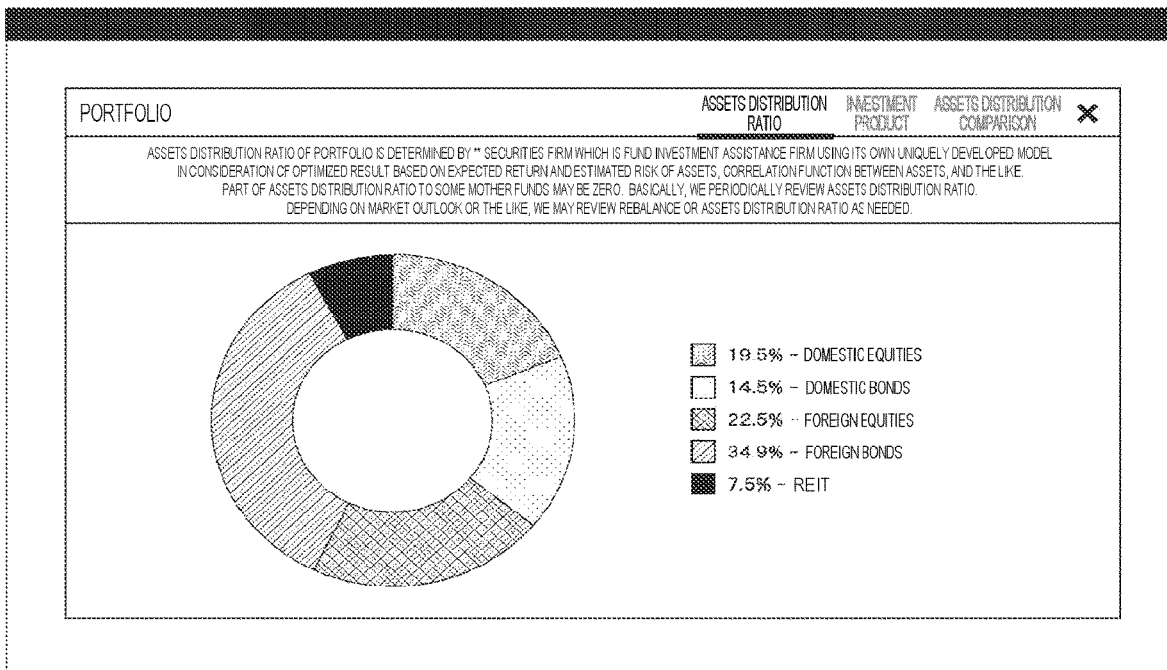
FIG. 22 illustrates a screen for presenting the portfolio corresponding to the investment plan presented in FIG. 20.

Specifically, FIG. 21 illustrates that the investment plan presented in FIG. 19 is regenerated by changing the risk tolerance "3" to the risk tolerance "5". When the risk tolerance is changed from "3" to "5", the investment risk increases, but a period required for objective achievement can be reduced. FIG. 22 illustrates a screen for presenting the portfolio corresponding to the investment plan illustrated in FIG. 20.

The risk tolerance can be changed and adjusted by sliding and moving a risk level display indicated in a lower left field in the display screen illustrated in FIGS. 19 and 21 from side to side while operating an input device such as a mouse.

Thus, in the present invention, a plurality of pieces of portfolio information having different investment management contents can be generated as portfolio information for suggesting a single investment management corresponding to a plurality of pieces of objective information selected by a user.

Further, the already generated portfolio information can be regenerated as another portfolio information with a different investment management content according to a user's input operation.

Furthermore, the already generated portfolio information can be copied for generation of another portfolio information.

Accordingly, the user changes, for example, the risk tolerance for the objective set once, to thereby enable generation of a plurality of portfolios for the same objective by changing the content, and the user compares and reviews the portfolios, thereby making it possible to, for example, review the plan.

In this embodiment, the investment plan/portfolio currently being managed can also be generated and displayed as needed.

Figure 23:
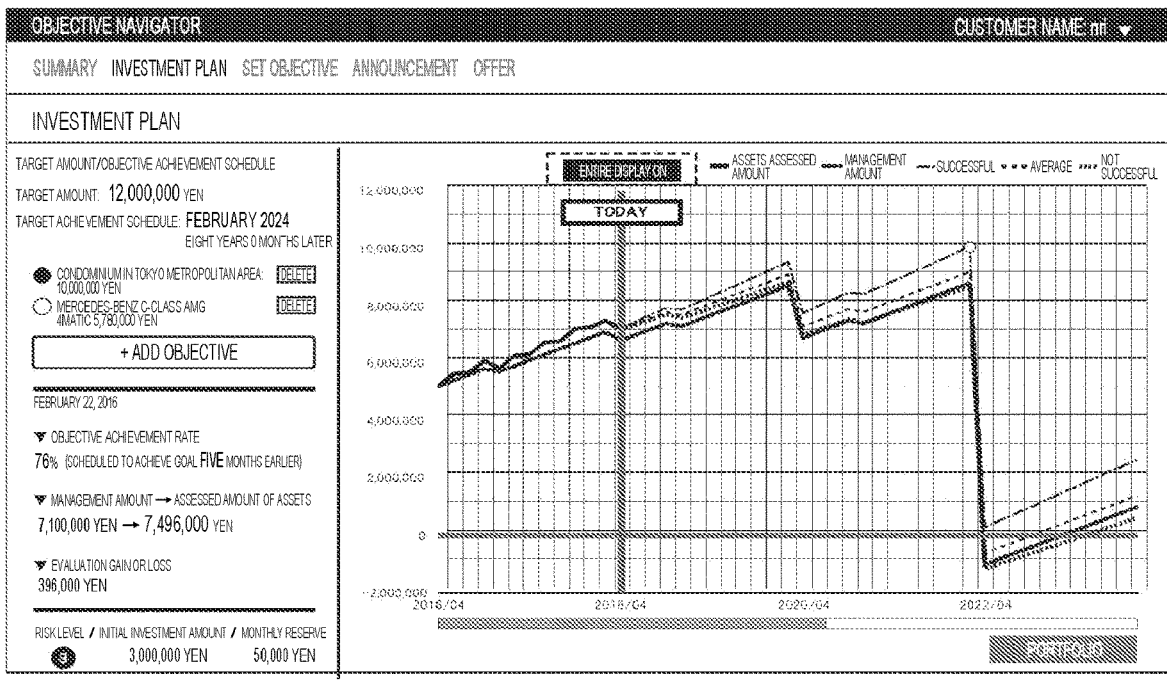
FIG. 23 illustrates a screen for displaying the entire investment plan that is currently managed, as an example of a display screen generated and displayed during generation of a portfolio in the objective achievement portfolio generating device according to an embodiment of the present invention.

FIG. 23 illustrates a screen for displaying the entire investment plan which is currently managed and for which the investment management is actually started based on the investment plan/portfolio generated with a content (scenario) similar to that illustrated in FIGS. 19 and 20 described above.

Figure 24:
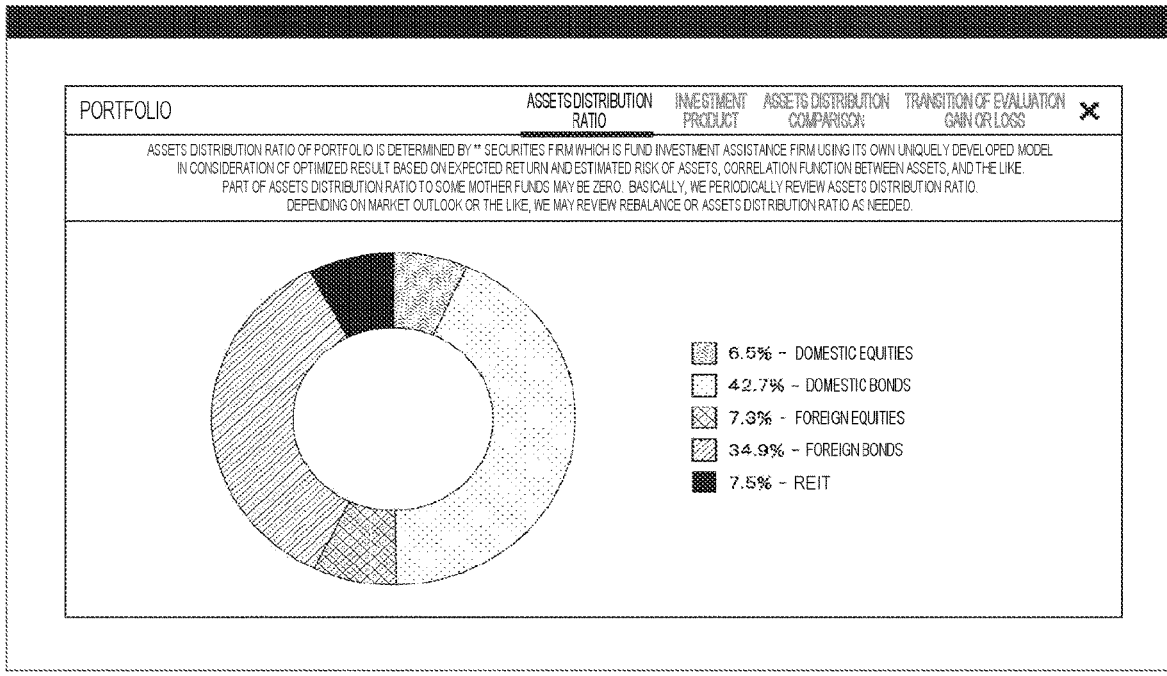
FIG. 24 illustrates a screen for displaying the portfolio corresponding to the investment plan that is currently managed and displayed in FIG. 23.

FIG. 24 illustrates a screen for displaying the portfolio corresponding to the investment plan which is currently managed and displayed in FIG. 23.

Figure 25:
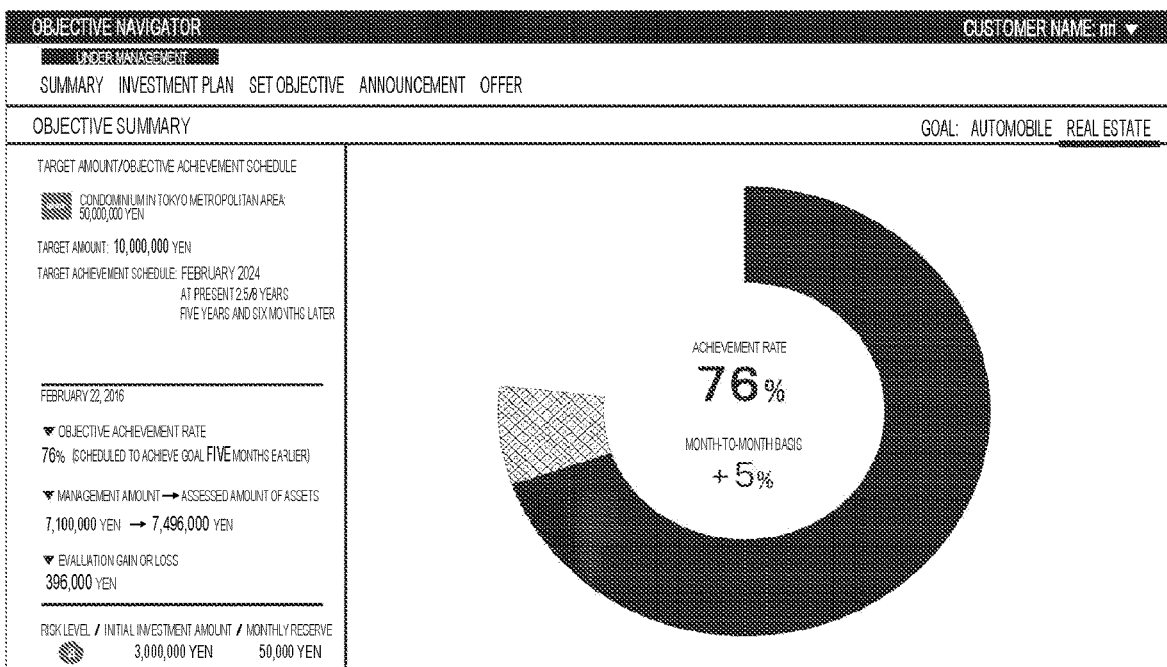
FIG. 25 illustrates a screen for displaying an achievement rate at the present time for an objective (real estate) in the current investment management displayed in FIG. 23.
Figure 26:
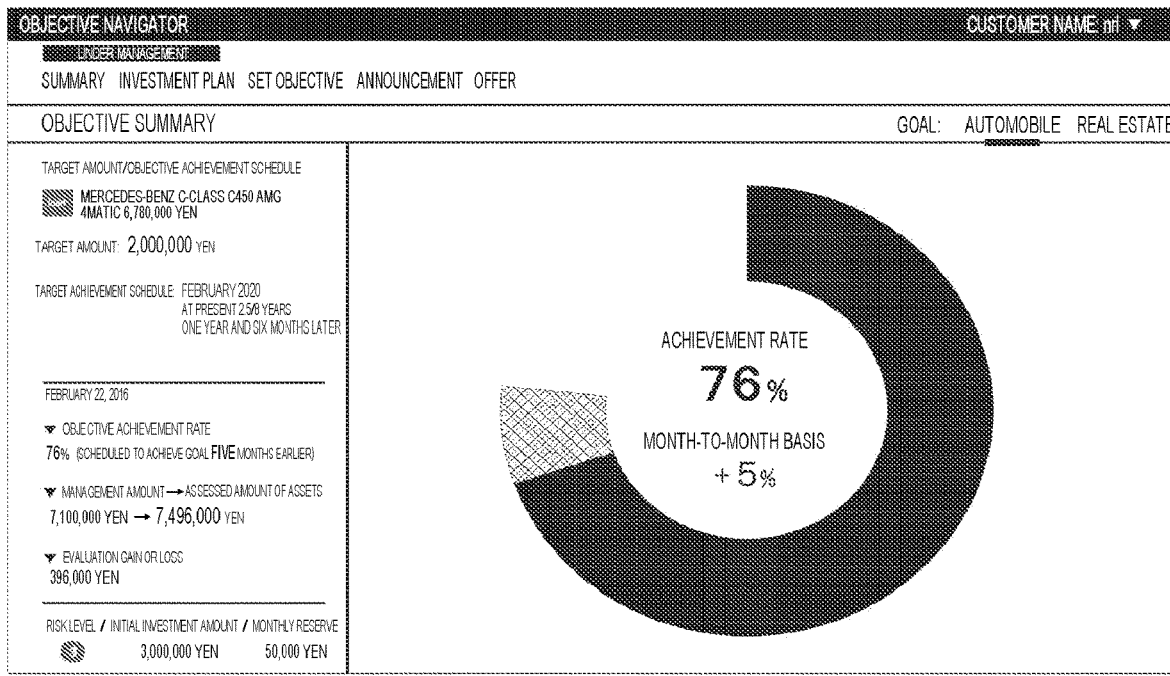
FIG. 26 illustrates a screen for displaying an achievement rate at the present time for another objective (automobile) in the current investment management, as in FIG. 23.

FIGS. 25 and 26 each illustrate a screen for displaying an achievement rate at the present time for one objective which is currently under investment management and displayed in FIG. 23. FIG. 25 illustrates the achievement rate for "real estate", and FIG. 26 illustrates the achievement rate for "automobile".

Further, a simulation can be performed on the investment plan/portfolio currently managed by changing, for example, only the risk tolerance as described above, and the portfolio and investment plan obtained as a result of simulation can be compared and contrasted with the portfolio and investment plan actually managed.

Figure 27:
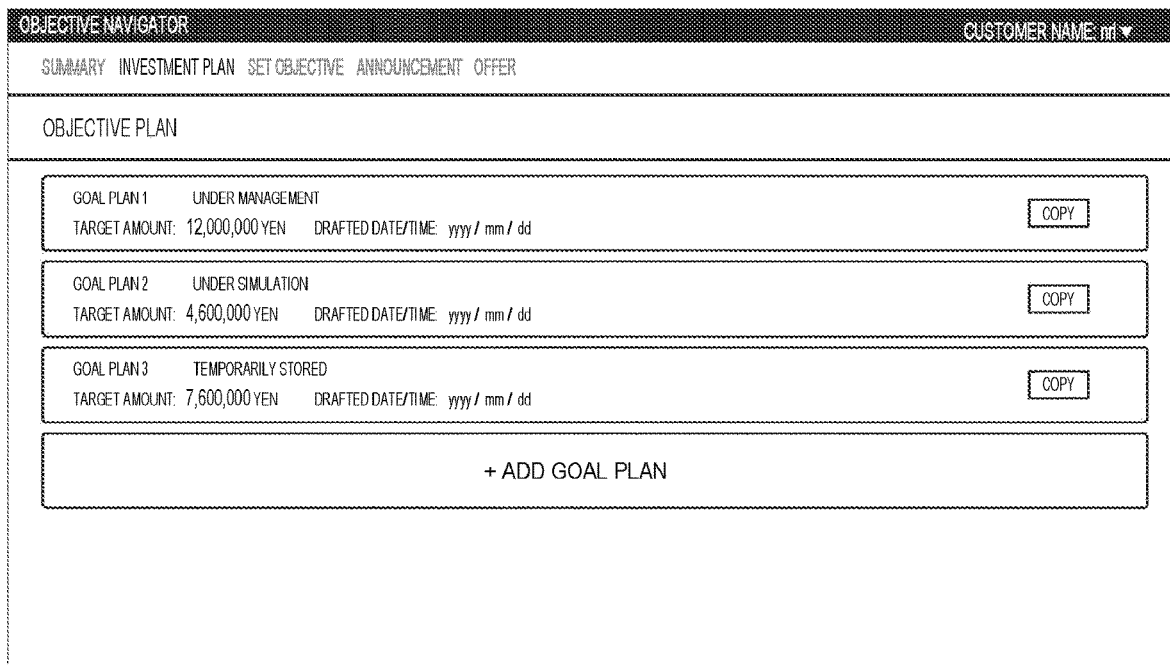
FIG. 27 illustrates a screen for displaying a list of objective plans including a currently managed objective plan, a currently simulated objective plan, and a temporarily stored objective plan as objective plans input and set by the user, as an example of a display screen generated and displayed during generation of a portfolio in the objective achievement portfolio generating device according to an embodiment of the present invention.

FIG. 27 illustrates a screen for displaying a list of objective plans for a certain user, including a currently managed objective plan, a currently simulated objective plan, and a temporarily stored objective plan as a scenario registered and stored as an objective plan input and set by the user.

Figure 28:
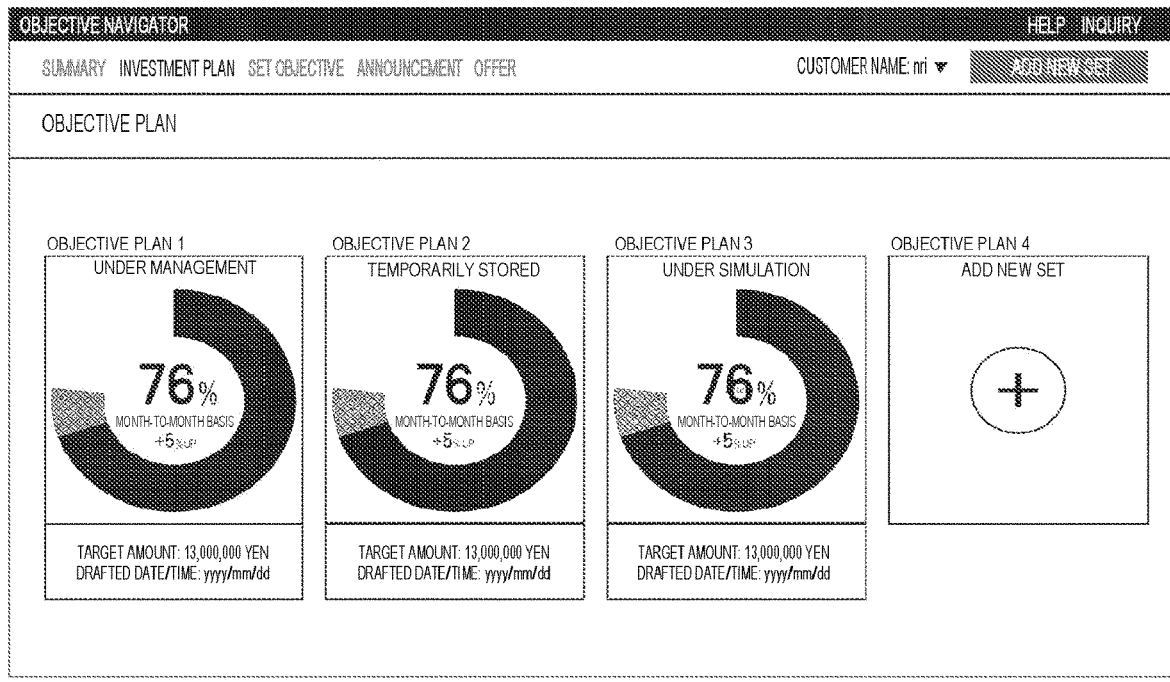
FIG. 28 illustrates a screen for displaying a list of achievement rates at the present time corresponding to the objective plans illustrated in FIG. 27.

FIG. 28 illustrates a screen for displaying a list of achievement rates at the present time of an objective plan being managed, an objective plan being simulated, and an objective plan being temporarily stored corresponding to FIG. 27.

Thus, this embodiment is configured not only to simply present the recommended investment plan/portfolio, but also to simultaneously generate and display data being actually managed and data on simulations and, for example, compare and contrast the data.

As a result, for example, data actually managed for investment can be replaced by data managed on simulations.

Thus, in the present invention, a plurality of pieces of portfolio information having different investment management contents can be generated as information that can be displayed on the same screen of the display means of the customer terminal 30 of the user.

This configuration enables the user to check the current management content, as needed, and to, for example, easily change and review the plan, so that flexible measures can be taken depending on the current status or trend, such as the market or market price.

Further, in this embodiment, predetermined information about the user associated with portfolio information generated as described above is transmitted to the sales company device 41 of the sales company 40 related to at least one of a plurality of pieces of objective information (real estate, automobile, and the like) included in the portfolio information.

In this case, as for a transmission timing of the predetermined information to the sales company device 41 of the sales company 40, the predetermined information may be transmitted by the user at any timing, or may be transmitted when the achievement degree with respect to the objective information or the management record with respect to the current objective reaches a predetermined threshold.

Further, the sales company 40 may be configured not only to simply receive the predetermined information about the user, but also to be capable of accessing to the system, extracting a user corresponding to a search condition, and transmitting promotion and advertising to the extracted user (however, information capable of specifying the user is not output).

With this configuration, the sales company 40 can promptly obtain information about, for example, a user who is considering to purchase a real estate, or a user who is considering to renew a user's automobile, and thus effectively perform promotion and advertising for the user.

For example, an automobile sales company that has a major change of a certain type coming up can access the system and extract users who have set, as an objective, the automobile type and/or an automobile type similar to the automobile type (conditions, such as a target amount achievement rate and a management amount, can also be added). With this configuration, the user can be informed of a change in the price of the automobile in accordance with the major change. Some users change the price, so that the current management amount reaches the amount to achieve the objective. Thus, the target amount may be automatically changed.

Figure 29:
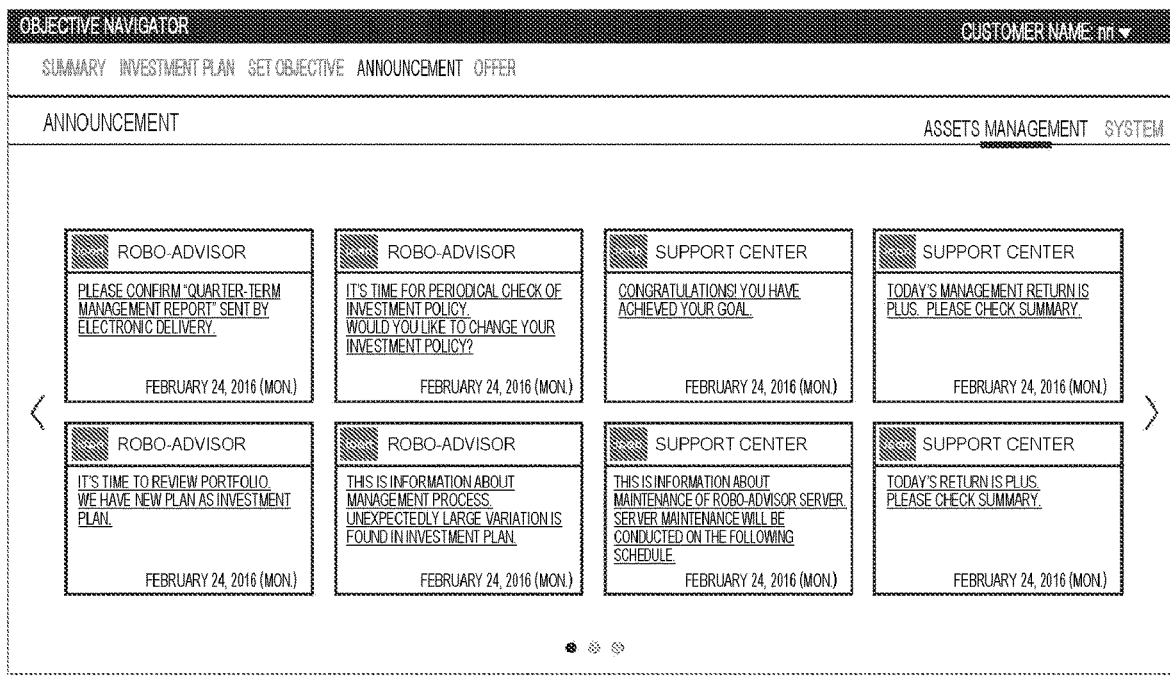
FIG. 29 illustrates a screen for displaying a list of announcement information for users, as an example of a display screen generated and displayed during generation of a portfolio in the objective achievement portfolio generating device according to an embodiment of the present invention.

FIGS. 29 and 30 illustrate examples of services and information provided to the user who uses the system. FIG. 29 illustrates a screen for displaying a list of announcement information about the investment management provided from the financial institution 20. FIG. 30 illustrates a screen for displaying a list of information provided from the sales company corresponding to the objective information registered by the user.

Note that, as for the transmission of user information to the sales company device 41 of the sales company 40, the user information can be transmitted to the sales company device 41 of the sales company 40 from the customer information transmission means 16 of the investment management assistance server 10 at a goal registration timing (FIG. 2: step S04) when, for example, the investment plan/portfolio information described above is generated, after gaining permission or approval of the user.

As an offer for promotion and advertising or the like from the sales company 40, the offer can be sent from the sales company 40 as a product provider in accordance with the content of the goal selected by the user in any of the modes of goal registration (FIG. 2: step S04), simulation (FIG. 2: step S08), and actual investment management (FIG. 2: step S08).

Examples of the offer from the sales company 40 include announcements (such as latest information or events) and privileges (such as discount coupons or campaigns) from the sales company 40 as a product provider.

Note that the embodiments described above illustrate a case where information is displayed on display means with a relatively large screen, such as a display of a PC, as an example of display screens (FIGS. 3 to 17 and 19 to 30) output and displayed on the customer terminal 30.

However, the display screens generated and displayed in the present invention may be displayed on display means with a relatively small screen, such as display means of a mobile phone or a smartphone.

Figure 31:
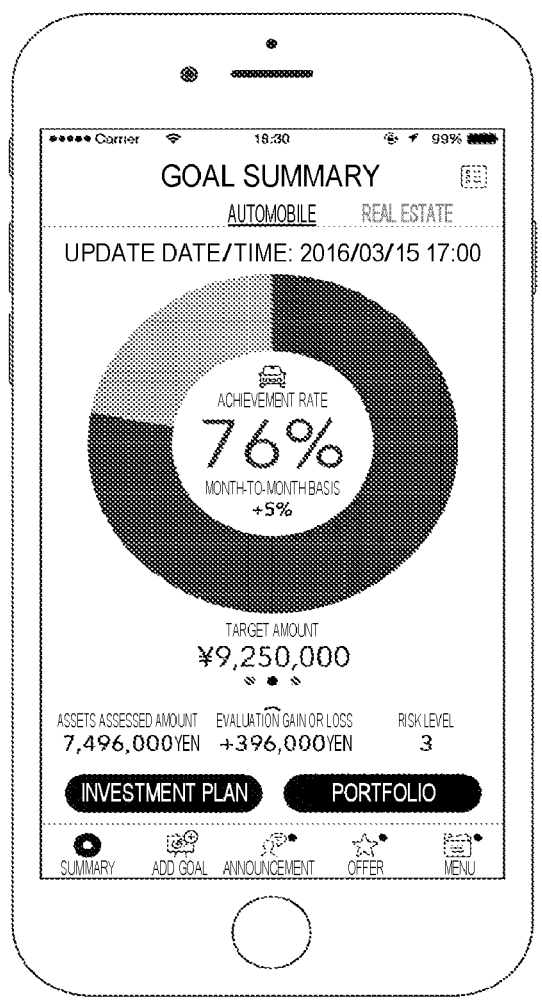
FIG. 31 illustrates an example of a case where a customer terminal according to the present invention is a smartphone, as an example of a display screen generated and displayed during generation of a portfolio in the objective achievement portfolio generating device according to an embodiment of the present invention.

FIG. 31 illustrates an example of a display screen when the customer terminal 30 is a smartphone.

In this manner, the functions managed by the objective achievement portfolio generating device according to the present invention can be used anytime and anywhere also in a small mobile terminal or the like, and investment management serves with high user-friendliness and availability for users can be provided.

As described above, according to this embodiment, the investment management API 11 managed by the investment management assistance server 10 constituting the objective achievement portfolio generating device according to the present invention is provided so that the investment management API 11 can be displayed and used on the customer terminal 30 of the user through the investment management application 21 of the financial institution 20.

Further, the user sequentially selects one or two or more display items in accordance with the display content of the investment management application 21 displayed on the customer terminal 30, and inputs a response to interview information, thereby making it possible to generate a single portfolio assuming a plurality of targets corresponding to the objective or goal of the investment management of the user and to display and output the portfolio.

Thus, unlike an abstract investment management plan or portfolio having no specific objective or the like, a realistic portfolio constructed so as to achieve a specific desired goal of the user is presented, which helps the user to have a big dream or pleasure for the future, get motivated for investment, and further increase an incentive to the investment and investment management.

Further, a plurality of portfolios corresponding to a specific objective or the like can be generated for the same objective by changing the content, such as the risk tolerance, and the portfolios can be reviewed by, for example, easily comparing and contrasting the portfolios.

Accordingly, for example, also for the formation of assets currently managed, a plan review or the like can be made based on latest analysis data or the like, and an investment management suggestion system with high user-friendliness and availability for users can be provided.

In this manner, according to one embodiment of the objective achievement portfolio generating device according to the present invention, various needs from various investors can be flexibly satisfied. In particular, the objective achievement portfolio generating device according to the present invention can be implemented as Fin Tech which is capable of suggesting investment management suitable for individual investors who desire specific and planned investment management depending on the life stage or the like.

While the present invention has been described above with reference to preferred embodiments, the present invention is not limited to the embodiments described above and can be modified in various ways within the scope of the present invention, as a matter of course.

For example, in the embodiments described above, seven items of real estate, automobile, travel, hobby, life event, retirement, and savings are displayed and provided as objective information according to the present invention in the objective/goal display selection item that becomes a portal for the generation of a portfolio. However, this is illustrated by way of example only. Alternatively, the objective information can be changed, added, or reduced. Also, the sales company can be, for example, changed, added, or reduced, according to the objective information.

Similarly, the interview information to which the user responds is also not limited to that in the embodiments described above, necessary interview information can be arbitrarily set and changed.

Further, the display screens that can be displayed and browsed on the customer terminal illustrated in the embodiments described above are illustrated by way of example only, and the configuration and content of each screen can be arbitrarily set and changed, as a matter of course.

INDUSTRIAL APPLICABILITY

The present invention is applicable to an investment management suggestion system for a financial institution or the like to assist operations for making an advice or suggestion associated with an investment for an investor.

REFERENCE SIGNS LIST

10 Investment management assistance server
11 Investment management API
12 Investment management assistance DWH
13 Objective display means
14 Interview display means
15 Portfolio generation/display means
16 Customer information transmission means
20 Financial institution
21 Investment management application
22 Financial institution system
30 Customer terminal
40 Sales company
41 Sales company device
50 Financial institution backbone system

The invention claimed is:

1. An information processing system connected via at least one network to a user terminal of a user, comprising:
a memory storing predetermined objective information related to products and/or services and predetermined interview questions; and
a processor configured to perform operations, including:
graphically presenting, on a display of the user terminal, the predetermined objective information related to the products and/or services selectable by the user as a goal list of goals of an investment to be met on behalf of the user,
receiving, from the user terminal, a plurality of goals selected on the display by the user from the goal list,
obtaining, from the user via the user terminal, a target quantity and target objective achievement schedule information for each of the plurality of goals,
generating and graphically presenting, on the display of the user terminal, predetermined interview questions about the user, the plurality of goals, products and/or services related to the plurality of goals and a risk tolerance of the investment that can be allowed by the user,
receiving, from the user via the user terminal, responses to the predetermined interview questions, which are input by the user on the display,
generating a single plan for reaching the plurality of goals based on the predetermined objective information and the responses to the predetermined interview questions,
performing a simulation by virtually performing the investment without actually investing money based on the single plan, and
graphically presenting, on the display of the user terminal, the risk tolerance and a result of the simulation, wherein the result includes a graph with lines showing a simulation, which includes a first increase from a start of the investment virtually performed and a first decrease due to a virtual achievement of one of the plurality of goals, and an appearance of the graph is changeable by changing and adjusting the risk tolerance by a input from the user via an input device of the user terminal over the risk tolerance graphically presented on the display.

2. A non-transitory computer readable medium embodying an objective achievement program for a computer, the objective achievement program causing the computer to perform a method comprising:
graphically presenting, by the computer on a display of a user terminal, predetermined objective information related to products and/or services selectable by a user as a goal list of goals of an investment to be met on behalf of the user;
receiving, by the computer from the user terminal, a plurality of goals selected on the display by the user from the goal list;
obtaining, by the computer from the user via the user terminal, a target quantity and target objective achievement schedule information for each of the plurality of goals;
generating and graphically presenting, by the computer on the display of the user terminal, predetermined interview questions about the user, the plurality of goals, products and/or services related to the plurality of goals and a risk tolerance of the investment that can be allowed by the user;
receiving, by the computer from the user via the user terminal, responses to the predetermined interview questions, which are input by the user on the display;
generating a single plan for reaching the plurality of goals based on the predetermined objective information and the responses to the predetermined interview questions;
performing, by the computer, a simulation by virtually performing the investment without actually investing money based on the single plan; and
graphically presenting, on the display of the user terminal, the risk tolerance and a result of the simulation, wherein the result includes a graph with lines showing a simulation, which includes a first increase from a start of the investment virtually performed and a first decrease due to a virtual achievement of one of the plurality of goals, and an appearance of the graph is changeable by changing and adjusting the risk tolerance by a input from the user via an input device of the user terminal over the risk tolerance graphically presented on the display.

3. A method of obtaining information from a user by an interactive inquiry dialogue generated by a computer, comprising:
graphically presenting, by the computer on a display of a user terminal, predetermined objective information related to products and/or services selectable by the user as a goal list of goals of an investment to be met on behalf of the user;
receiving, by the computer from the user terminal, a plurality of goals selected on the display by the user from the goal list;
obtaining, by the computer from the user via the user terminal, a target quantity and target objective achievement schedule information for each of the plurality of goals;
generating and graphically presenting, by the computer on the display of the user terminal, predetermined interview questions about the user, the plurality of goals, products and/or services related to the plurality of goals and a risk tolerance of the investment that can be allowed by the user;

receiving, by the computer from the user via the user terminal, responses to the predetermined interview questions, which are input by the user on the display;

generating a single plan for reaching the plurality of goals based on the predetermined objective information and the responses to the predetermined interview questions;

performing, by the computer, a simulation by virtually performing the investment without actually investing money based on the single plan; and graphically presenting, on the display of the user terminal, the risk tolerance and a result of the simulation, wherein the result includes a graph with lines showing a simulation, which includes a first increase from a start of the investment virtually performed and a first decrease due to a virtual achievement of one of the plurality of goals, and an appearance of the graph is changeable by changing and adjusting the risk tolerance by a input from the user via an input device of the user terminal over the risk tolerance graphically presented on the display.

4. The information processing system according to claim 1, wherein the generating of the single plan includes obtaining a plurality of pieces of different management information, suggesting the single plan, corresponding to the plurality of goals selected by the user.

5. The information processing system according to claim 4, wherein the single plan is displayed on the display of the user terminal.

6. The information processing system according to claim 1, wherein the processor is further configured to generate a different plan upon receipt of different responses from the user to the predetermined interview questions.

7. The information processing system according to claim 1, wherein the processor is further configured to transmit predetermined user information about the user to an external device related to at least one piece of the predetermined objective information.

8. The information processing system according to claim 6, wherein the processor is further configured to create a copy of the single plan in the memory and to generate the different plan from the copy.

9. The information processing system according to claim 1, wherein the predetermined interview questions include questions regarding individual attribute information about the user.

10. The information processing system according to claim 4, wherein the processor is further configured to generate a different plan upon receipt of different responses from the user to the predetermined interview questions.

11. The information processing system according to claim 5, wherein the processor is further configured to generate a different plan upon receipt of different responses from the user to the predetermined interview questions.

12. The information processing system according claim 4, wherein the processor is further configured to transmit predetermined user information about the user to an external device related to at least one piece of the predetermined objective information.

13. The information processing system according to claim 5, wherein the processor is further configured to transmit predetermined user information about the user to an external device related to at least one piece of the predetermined objective information.

14. The information processing system according claim 10, wherein the processor is further configured to create a copy of the single plan in the memory and to generate the different plan from the copy.

15. The information processing system according to claim 11, wherein the processor is further configured to create a copy of the single plan in the memory and to generate the different plan from the copy.

16. The information processing system according to claim 4, wherein the predetermined interview questions include questions regarding individual attribute information about the user.

17. The information processing system according to claim 5, wherein the predetermined interview questions include questions regarding individual attribute information about the user.

18. The information processing system according to claim 12, wherein the processor is further configured to generate a graphical illustration of the single plan with at least one of contribution and consumption plans for at least one of the products and/or services selected as the plurality of goals selected on the display by the user.

19. The information processing system according to claim 12, wherein the processor is further configured to enable the user to change the target quantity and the target objective achievement schedule information.

20. The information processing system according to claim 1, wherein the processor is further configured to cause the user terminal to display, on the display, the single plan obtained based on the target quantity and the target objective achievement schedule information for the plurality of goals selected on the display by the user.

* * * * *